March 8. 1960 J. I. DASPIT 2,927,751
AIR TRAFFIC CONTROL SYSTEM USING IDEAL APPROACH TRACKS
Filed Nov. 2, 1953 14 Sheets-Sheet 1

INVENTOR,
JOHN I. DASPIT
BY
ATTORNEYS

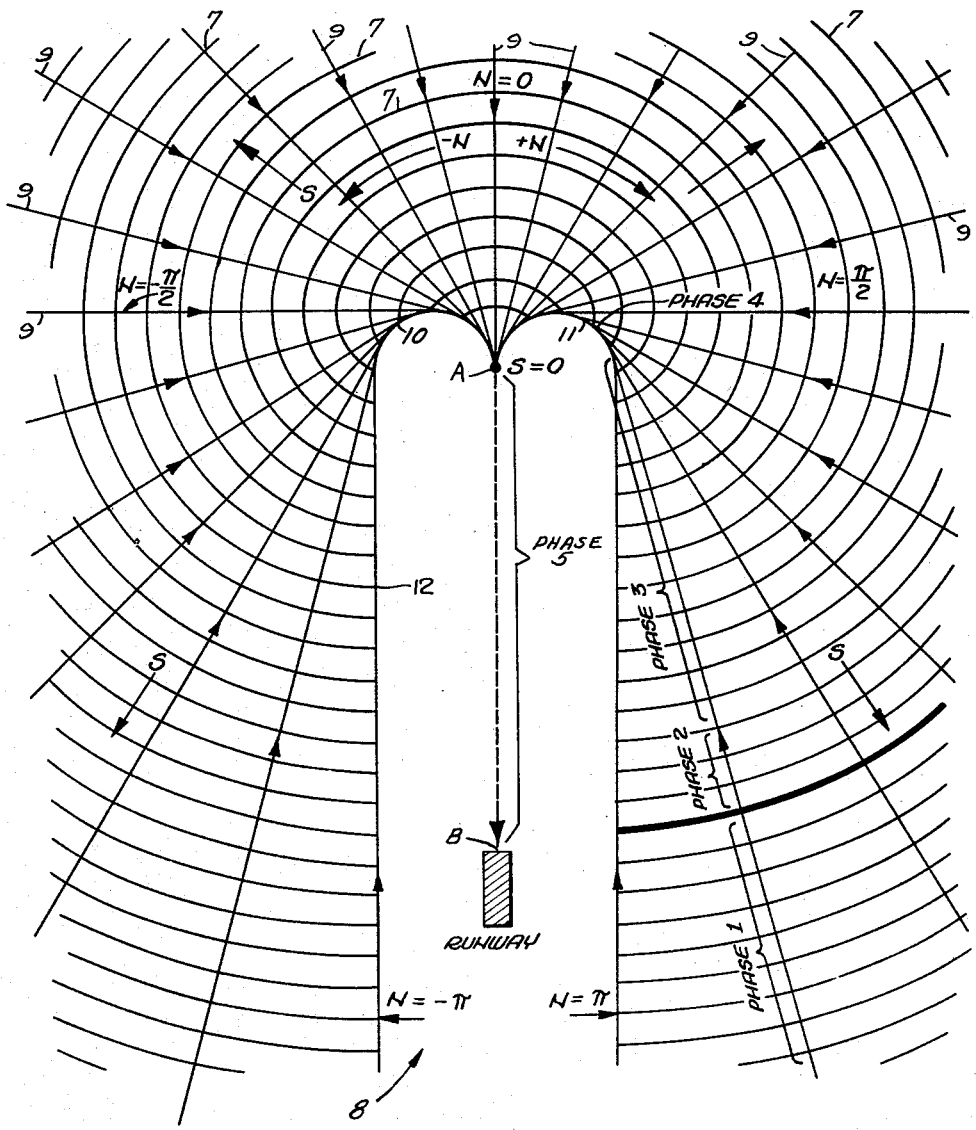

$$S_{an} = S_{12} + (S_a - S_{12}) \frac{V_n}{V_{aw}}$$

COORDINATE TRANSFORMATION COMPUTER OF FIG. 6

March 8, 1960 J. I. DASPIT 2,927,751
AIR TRAFFIC CONTROL SYSTEM USING IDEAL APPROACH TRACKS
Filed Nov. 2, 1953 14 Sheets-Sheet 6
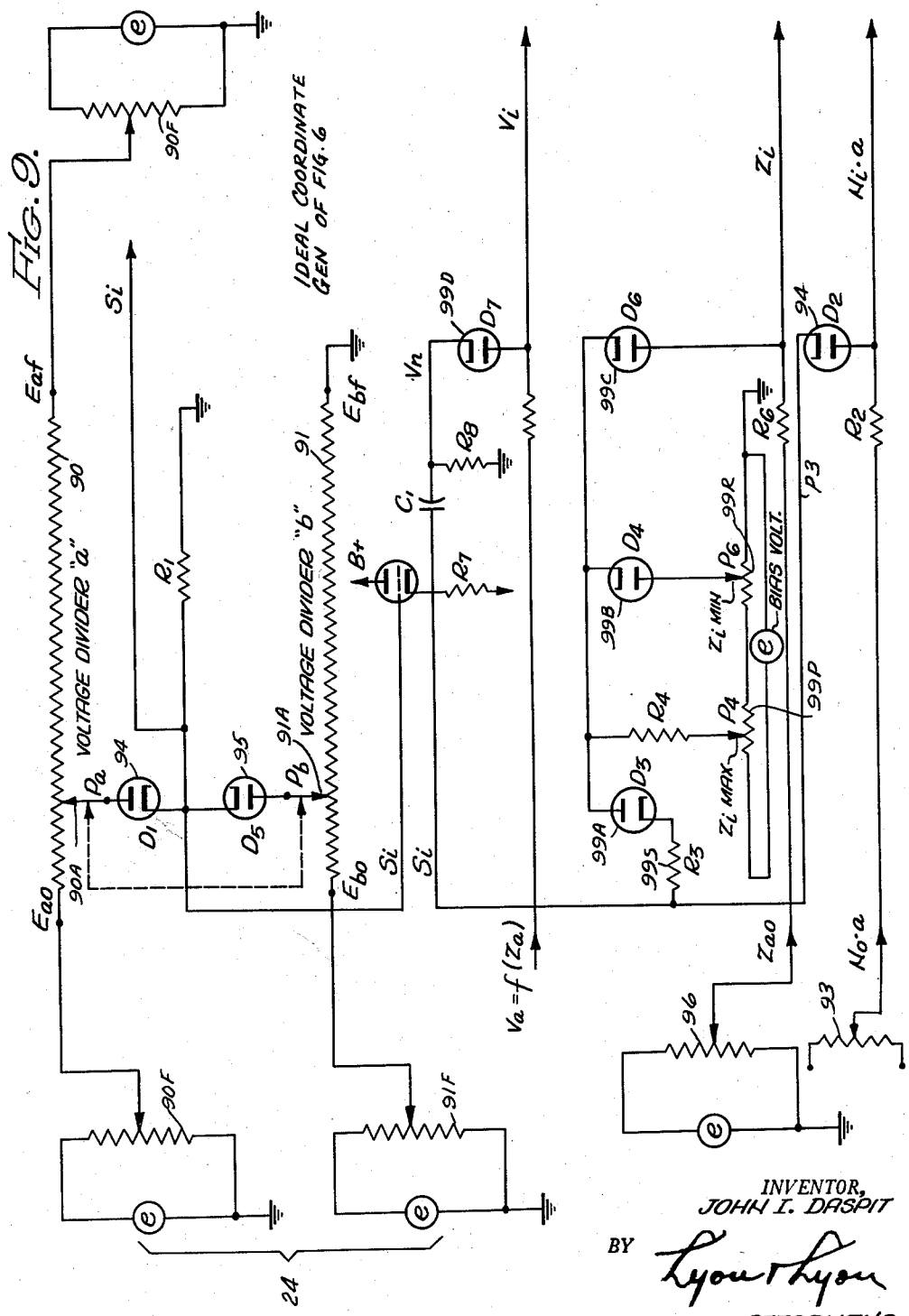
Fig. 9.
INVENTOR,
JOHN I. DASPIT
BY
ATTORNEYS

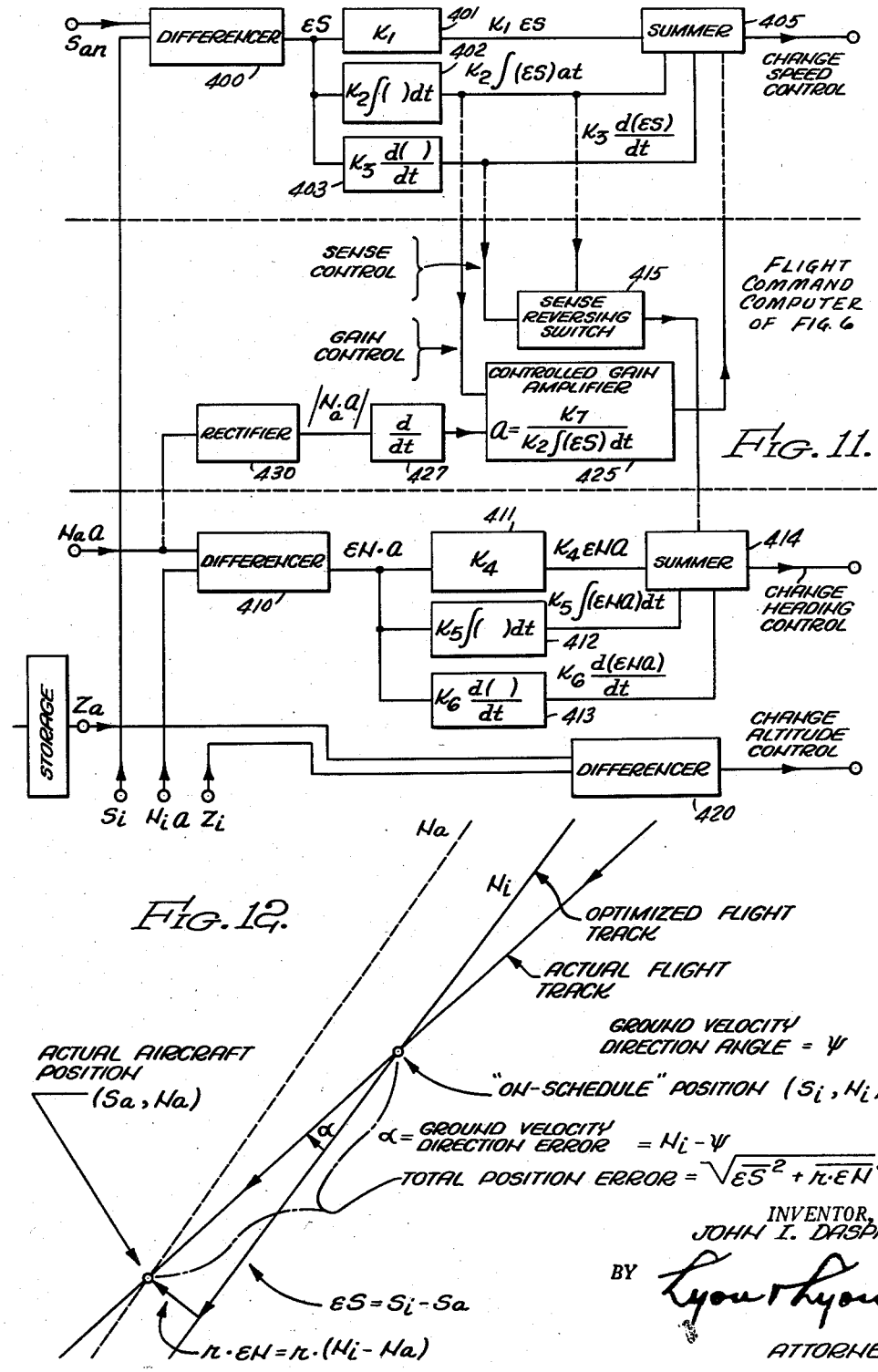

March 8, 1960 J. I. DASPIT 2,927,751
AIR TRAFFIC CONTROL SYSTEM USING IDEAL APPROACH TRACKS
Filed Nov. 2, 1953 14 Sheets-Sheet 10

INVENTOR,
JOHN I. DASPIT
BY Lyon & Lyon
ATTORNEYS

March 8, 1960  J. I. DASPIT  2,927,751
AIR TRAFFIC CONTROL SYSTEM USING IDEAL APPROACH TRACKS
Filed Nov. 2, 1953  14 Sheets-Sheet 11

INVENTOR,
JOHN I. DASPIT
BY Lyon & Lyon
ATTORNEYS

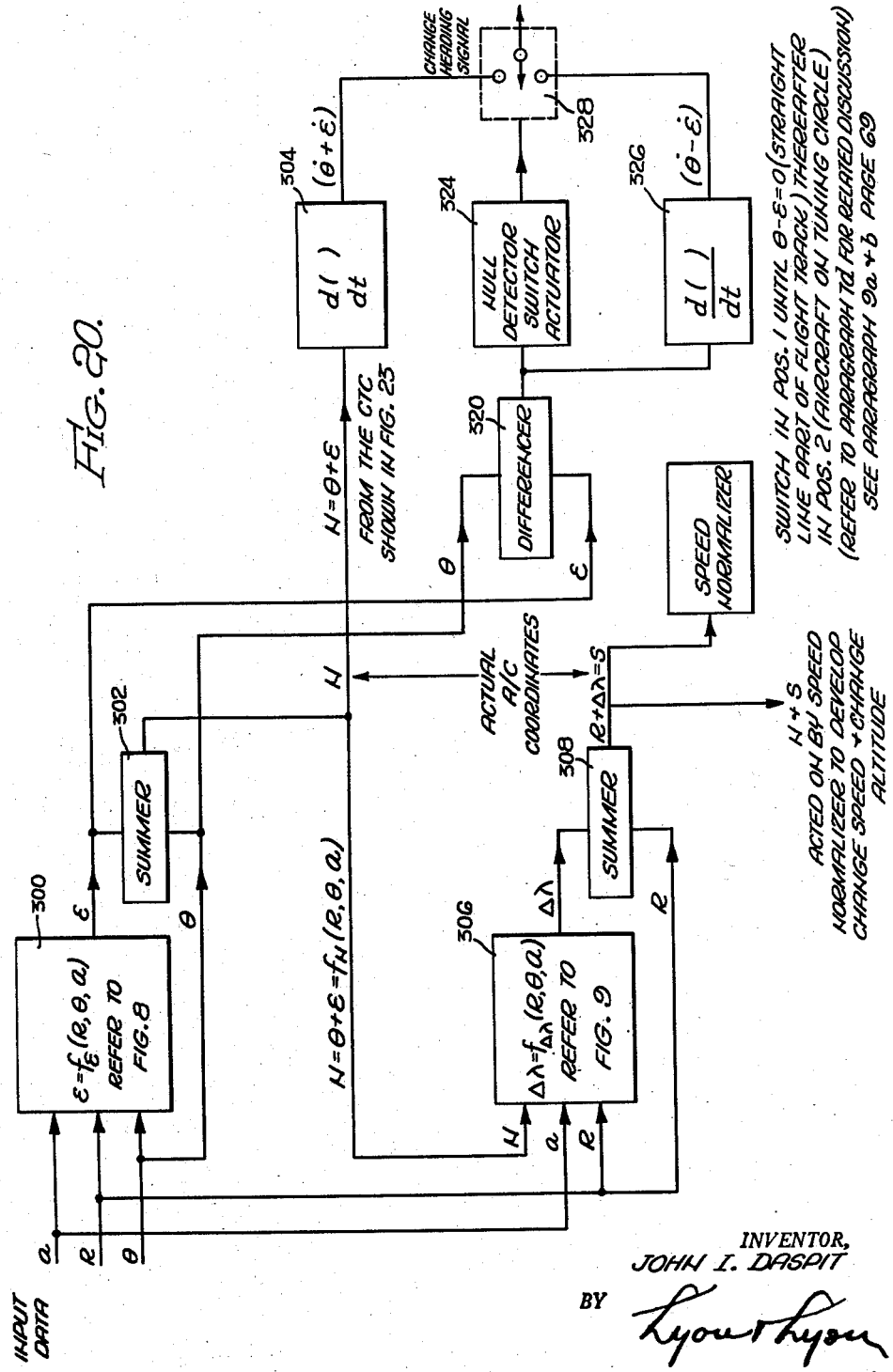

United States Patent Office 2,927,751
Patented Mar. 8, 1960

2,927,751

AIR TRAFFIC CONTROL SYSTEM USING IDEAL APPROACH TRACKS

John I. Daspit, Los Angeles, Calif., assignor to Gilfillan Bros. Inc., Los Angeles, Calif., a corporation of California Application November 2, 1953, Serial No. 389,542

5 Claims. (Cl. 244—77)

The present invention relates generally to improved means and techniques useful in directing automatically the flight of a plurality of aircraft into a predetermined area.

The present arrangement involves a system for scheduling and controlling the flight of a large number of aircraft such as, for example, interceptor aircraft during their return to their base or landing area, the system taking into account the characteristics of the aircraft and operational requirements. Further, the system is so instrumented so that flight scheduling and control of all aircraft is accomplished essentially simultaneously. The system as described herein is for example, for purposes of scheduling and controlling the flight of aircraft into an area wherein such aircraft are or may be brought under the control of an automatic GCA (ground controlled approach) system and in that respect, the present arrangement is intended to control the flight of aircraft from a position of approximately 200 miles away from a landing area or from the maximum range of a search radar system to, for example, a position 10 miles or other desired distance from the landing strip or field, in which latter position the automatic GCA system takes control of the aircraft.

It is, therefore, a general object of the present invention to provide improved means and techniques for achieving the above indicated results.

A specific object of the present invention is to provide improved means and techniques whereby efficient use may be made of interceptor aircraft, and in particular jet aircraft.

Another object of the present invention is to provide improved means and techniques in an improved system wherein due consideration is given to flight safety and time for runway clearance, particularly when the present system is operated in conjunction with a manual or an automatic terminal area navigation system such as, for example, a GCA or automatic GCA system wherein the aforementioned flight safety and time for runway clearance imposes a limitation on the density of traffic which enters the acquisition area of the AGCA (automatic ground controlled approach) system.

Another specific object of the present invention, therefore, is to provide a system of this character in which an orderly flow of aircraft traffic enters the terminal area control system without overcrowding.

Another specific object of the present invention is to provide an improved system of this character which incorporates improved means for automatically scheduling the time of arrival of aircraft and automatically orienting or vectoring, or directing the flight of the aircraft while maintaining its scheduling, such functions of automatic long range time scheduling and automatic vectoring being performed so as to impose a minimum delay in arrival of the aircraft with the expenditure of a relatively small amount of additional fuel.

Another object of the present invention is to provide an improved system of this character which involves economical use of fuel, simplicity of flight paths, ease of flying designated paths, ease with which pilots and controllers may visualize flight paths, traffic handling capacity, and accuracy of control and practicability of instrumentation.

Another object of the present invention is to provide an improved system of this character wherein the concept of moving zones is used in scheduling the flight of aircraft and in the respect the present arrangement constitutes an improvement in the system described and claimed in copending United States patent application Serial Number 272,140, filed February 18, 1952, now U.S. Letters Patent 2,844,817 patented July 22, 1958, in which the applicant is David J. Green, such application being assigned to the present assignee.

Another object of the present invention is to provide a system of this type wherein it is desired to control the flight of aircraft along so-called paths or tracks of constant N which comprises straight lines extending tangential to a pair of turning circles intersecting at a common point.

Another object of the present invention is to provide a system of this type wherein, two turning circles are used with respect to which straight lines, paths or tracks of constant N are tangential, the system is so instrumented that in effect, computations are made with respect to a single point and a single line, the point being the point of intersection of the turning circles and the line being a line which is tangential to both turning circles and passes through said point of intersection.

Another object of the present invention is to provide a system of this character wherein a set of ideal coordinates is automatically generated and such coordinates are effectively moved to trace the aforementioned paths of constant N, such ideal coordinates being compared with the actual coordinates of the aircraft to derive error signals which are, in turn, transmitted to the aircraft for controlling its speed (scheduling) and direction of movement.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 illustrates in graphical form a series of optimized flight paths or tracks, all leading into the so-called acquisition area of, for example, an AGCA system, all of such tracks terminating at a point approximately ten miles away from the landing area;

Figure 2 serves to illustrate in more detail the nature of the flight tracks illustrated in Figure 1, such tracks being expressed interms of two quantities or functions namely N and S in an orthogonal coordinate system;

Figure 3 is a graphical representation serving to illustrate the relationship between the NS coordinates shown in Figure 2 with respect to a different set of coordinates namely R and theta coordinates;

Figure 4 is a graphical representation which serves to correlate the values of the quantity S with the time to arrival (TTA) of the aircraft in phase 1, 2, 3, and 4, such phases 1, 2, 3 and 4 being also indicated in Figure 2, and such representation shown in Figure 4 is helpful in understanding the functioning of the apparatus used to instrument the system;

Figure 5 is another graphical representation for purposes of illustrating the geometry involved in the R and theta coordinate system with respect to the situs of the radar equipment which is used to develop information with respect to the position and speed of aircraft in the system, such information being used as illustrated in connection with the other figures to schedule and direct the flight of aircraft along paths or tracks of so-called constant N;

Figure 9 illustrates details of the so-called "ideal" coordinate generator which is designated as such in Figure 6;

Figure 11 illustrates details of the flight command computer which is designated as such in Figure 6;

Figure 13:
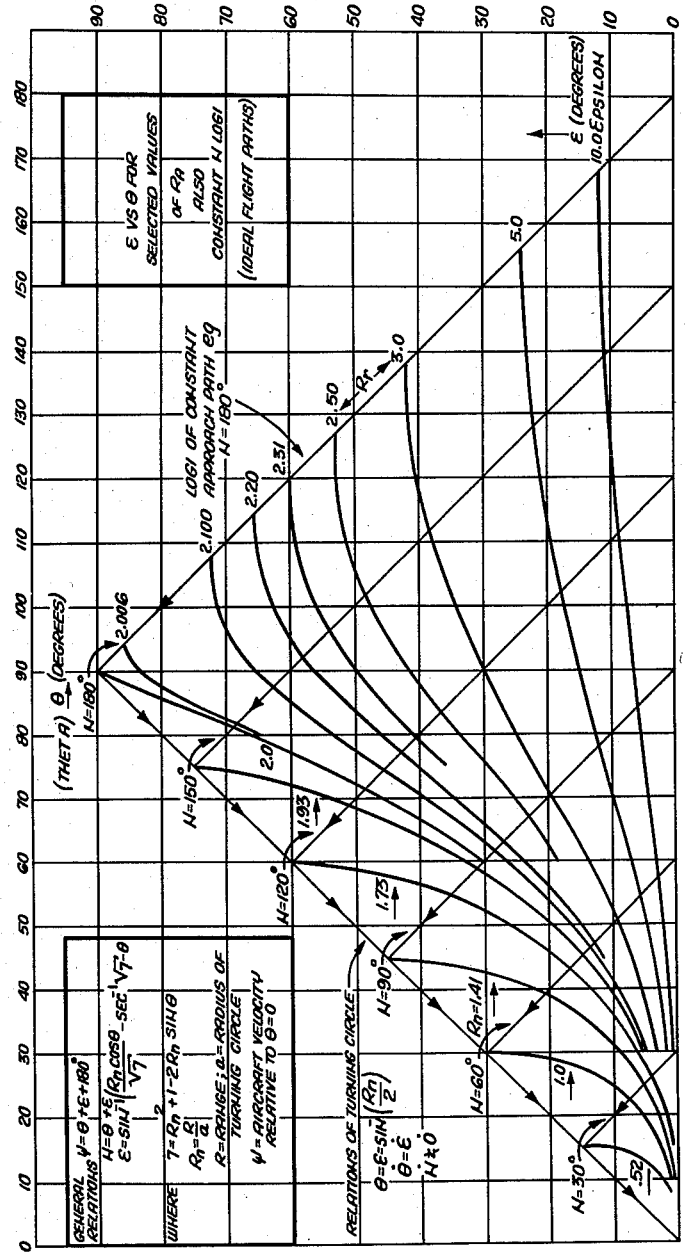
Figure 14:
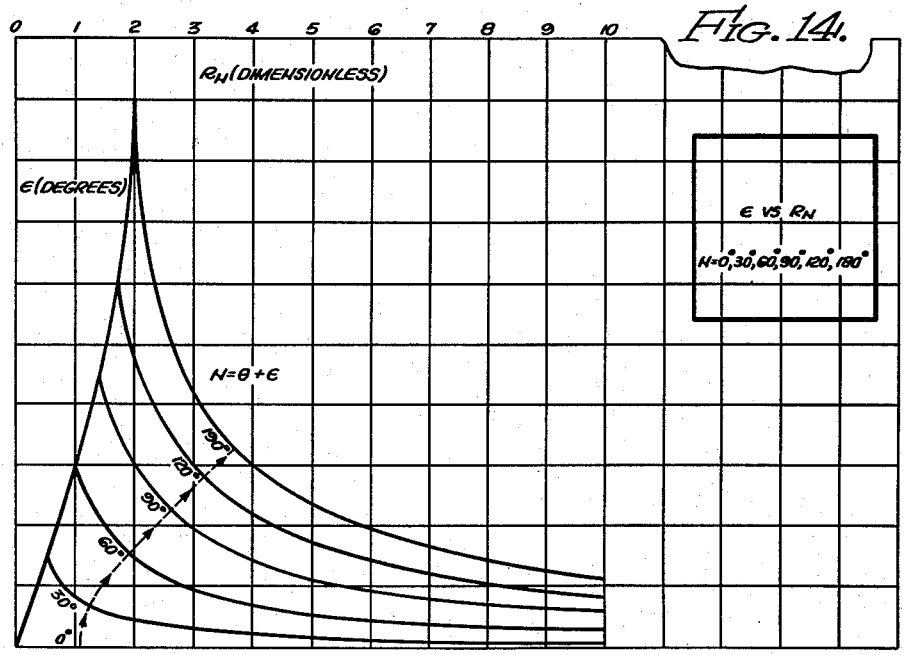
Figure 15:
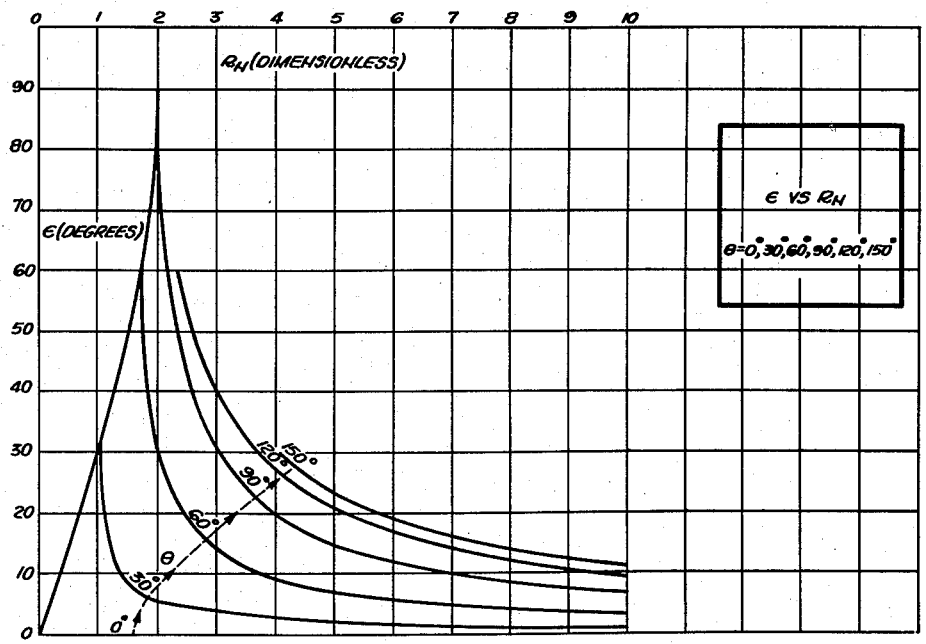
Figure 19:
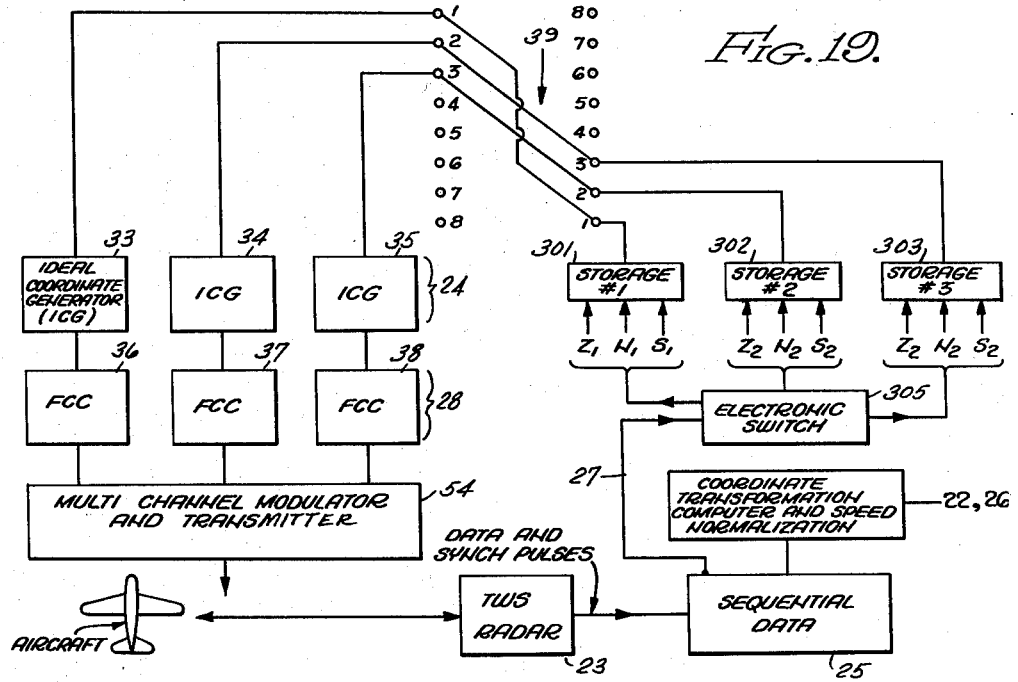
Figure 16:
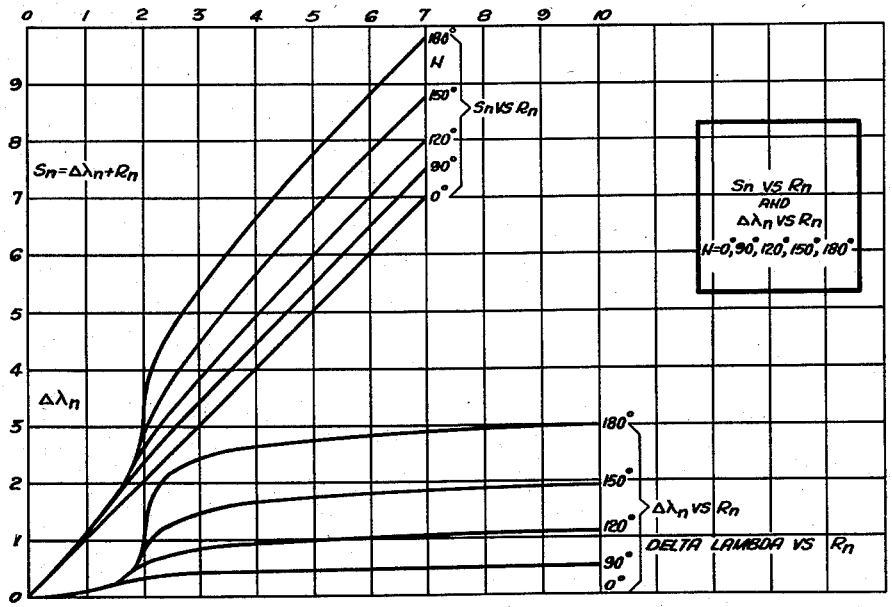
Figure 17:
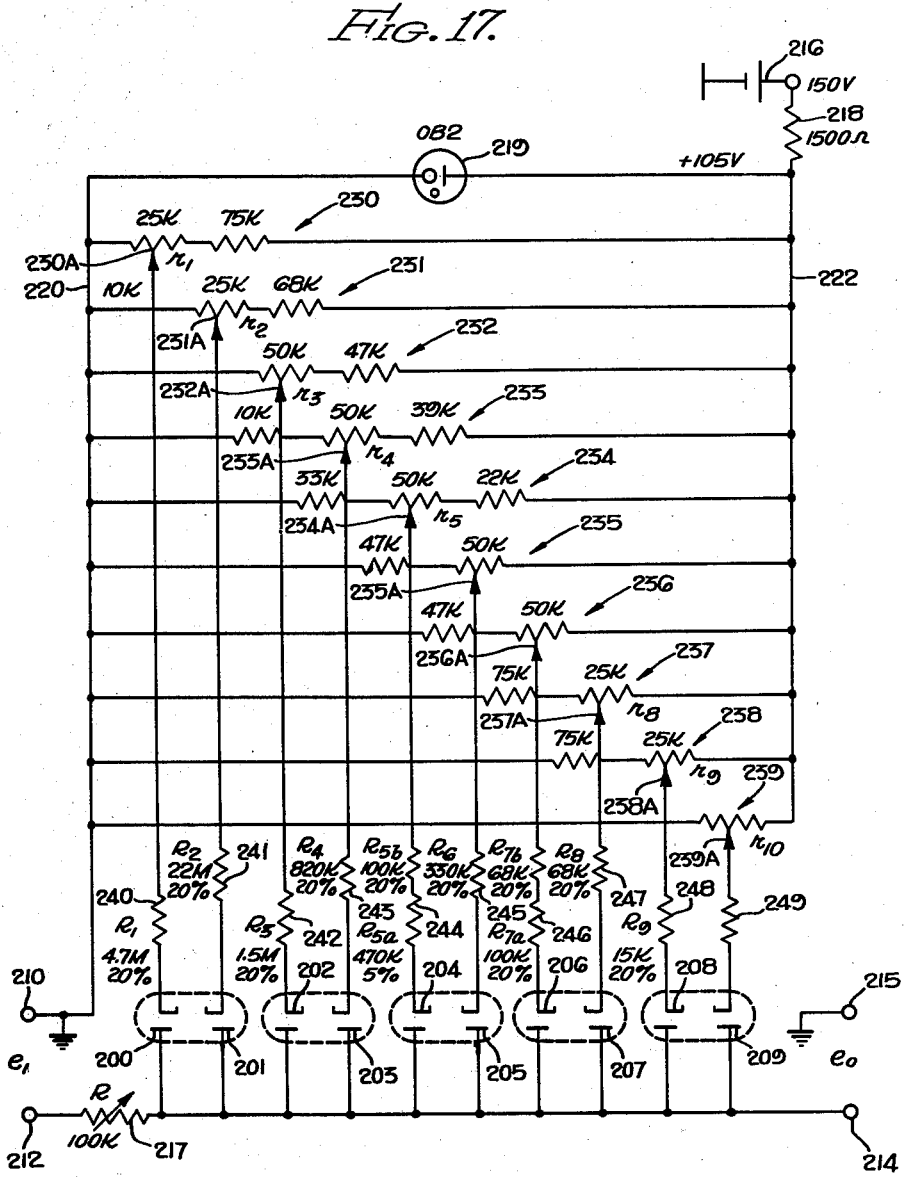
Figure 18:
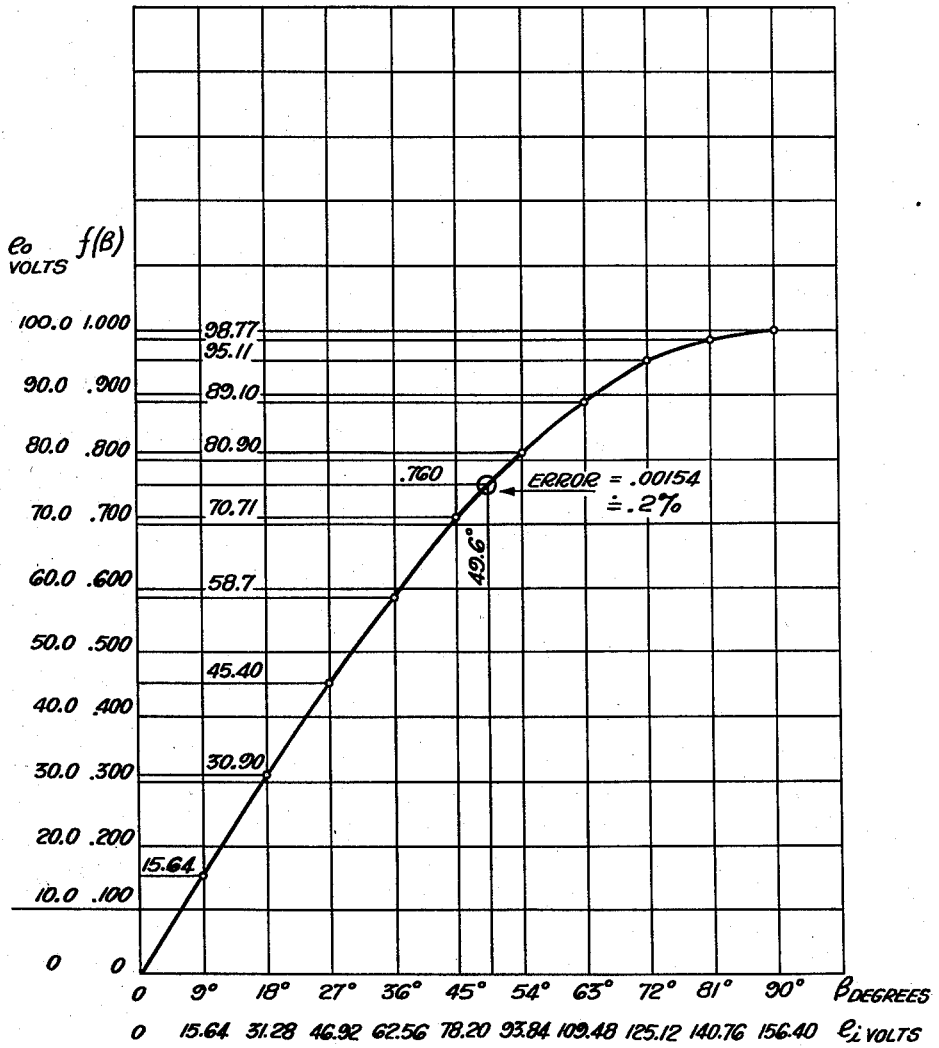

Figure 12 serves to illustrate in graphical form the character of the error signal which is developed and which is transmitted over a radio link to the aircraft;

Figure 13 illustrates the variation of the function theta with respect to epsilon for certain selected values of $R_n$ and serves to illustrate the constant N loci (ideal flight paths);

Figure 14 illustrates the relationship between the function epsilon in relationship to the value $R_n$ for values of $N=0°, 60°, 90°, 120°$ and $180°$;

Figure 15 illustrates the variation of the function epsilon with respect to $R_n$ when theta is equal to $0°, 30°, 60°, 90°, 120°$ and $150°$;

Figure 16 illustrates, on the one hand, the variation of $S_n$ with respect to $R_n$ and on the other hand, the variation of delta lambda$_n$ with respect to $R_n$ when N is equal to $0°, 90°, 120°, 150°$ and $180°$;

Figure 17 illustrates a so-called biased diode function generator adjusted in this particular case to produce a sine function;

Figure 18 illustrates the sine function approximation developed by the arrangement illustrated in Figure 17;

Figure 19 illustrates the overall system; and

Figure 20 illustrates an alternate form of apparatus for obtaining the N and S coordinates and the change heading signal.

Figure 1:
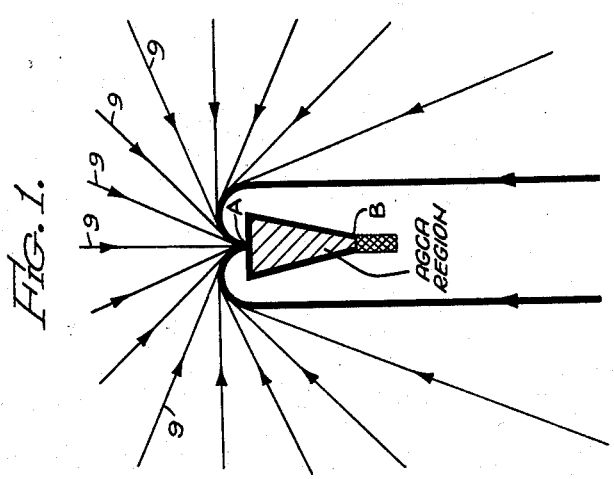

The system contemplates flight of aircraft along lines, paths or tracks 9 of so-called constant N which are illustrated in Figures 1 and 2, such path or track is one in which the aircraft is required to fly only in straight lines and a constant rate turn. For purposes of definition, the word "path" or "track" is defined as the projection of the flight path of the aricraft upon a horizontal plane as illustrated in Figures 1 and 2 wherein the parameter N is in the nature of an angle and the parameter S is in the nature of a linear measurement such as miles. It is postulated that the aircraft flies originally in a straight line, through phase 1, phase 2 and phase 3 and then, in (Figure 2) phase 4, turns at a standard rate turn of 3° per second until the line containing both the position of the aircraft and the touchdown point coincides with the tangent to the track. Thereafter, the aircraft under the control of GCA or AGCA flies in a straight line approach to touch down in phase 5. The family of tracks 9 of this type illustrated in Figure 2 thus constitutes a symmetrical approach pattern. Aircraft fly straight tracks toward the perimeter of the proper circle 10 or 11, as the case may be, of predetermined radius, follow the perimeter of the circle until they reach point A then fly a straight track, through what may be termed phase 5, to touchdown at point B. It is observed that the tangent to the circles 10 and 11 pass through point B. This means, that upon completion of the turn, the heading of the aircraft is correct for a straight line approach. The traffic control system maintains control of the aircraft until it reaches point A. At point A the AGCA or the GCA system, as the case may be, takes control and causes the aircraft to be directed to point B. It is observed that a pattern of this type leaves a corridor 8, having a width equal to four times the tuning radius, available for outbound traffic. All approaching aircraft entering this corridor are directed away from it.

It is observed that the most probable point of collision of independently piloted aircraft is at point A, and for that reason, the system assures a desirable separation between aircraft before the aircraft arrive at this point A. The system functions to predict the time of arrival of each aircraft at point A, and to schedule the arrival of the aircraft preferably as far from point A as possible. In this way corrections in flight path may be made when the probability of collision is less, and more time is available for final corrections.

With respect to Figure 2, it is observed that if all the points at an equal distance S from point A, measured along the flight tracks 9 are connected together, an involute curve 7, Figure 2, is obtained which is orthogonal (at right angles) to the flight tracks. These orthogonal or involute curves 7 are illustrated in Figure 2, there being one curve for each different value of S which as mentioned previously, designates distance. The characteristic of these involute curves is that all points on a curve representing a particular value of S are equidistant from point A measured along an assumed track 9 of so-called constant N. This establishes the basis for a two-dimentional orthogonal coordinate system in which the distance along a track 9 is termed S and the coordinate measured normal to the track is termed N. N has the dimensions of an angle.

It can be demonstrated that the values of the N and S coordinates of an aircraft are simply related to its corresponding plane-polar coordinates about an origin which is at the center of the appropriate or corresponding turning circle 10, or 11, as the case may be. This relation is established and expressed by the following three equations:

$$S = N_a + r \sin beta$$
$$N = gamma - beta$$
$$Beta = \sec^{-1}\left(\frac{r}{a}\right)$$

In these expressions, $a$ is the radius of the turning circle 10 or 11; S is the distance out along the predetermined flight track 9; N is the heading angle in radians of the aircraft; $r$ is the straight line distance from the center of the corresponding turning circle to the aircraft; beta is the angle designated as such in Figure 3; gamma is the angle designated as such in Figure 3 and is one of the polar coordinates.

Figure 5:
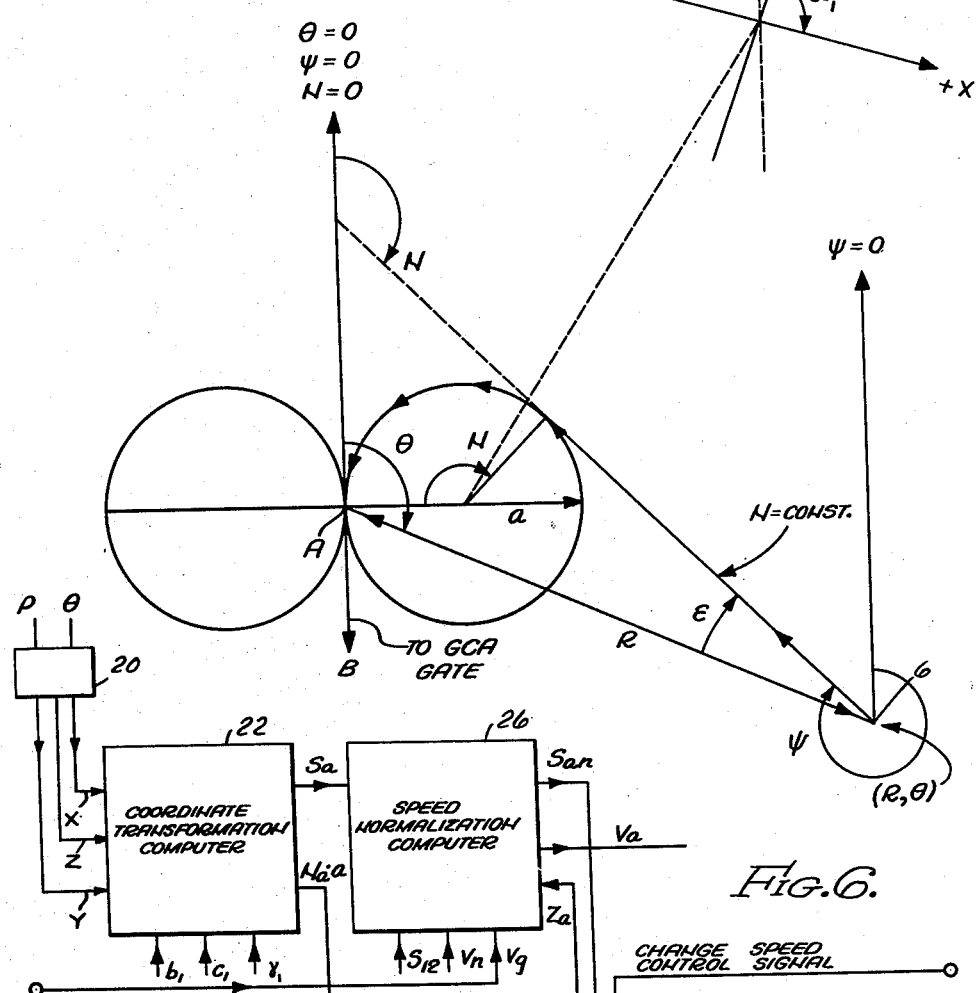

The plane-polar coordinates $r$ and gamma, are derived from the ground based radar system which is located at the point or situs 6 in Figure 5, such radar system being a so-called conventional track-while-scan (TWS) radar for developing information with respect to the position of all aircraft to be controlled as well as their speeds.

This information derived from TWS radar system is, of course, referred to the center of the corresponding turning circle and this involves the step of transferring the origin of cordinates from the TWS radar situs to the center of the corresponding turning circle. A second step involves the conversion of the radar information from rectangular coordinate form to polar coordinate form; and a third step may involve the rotation of the polar angle reference axis by the proper amount. This transformation of coordinates is discussed in greater detail hereinafter in connection with instrumentation of the system.

Figure 4:
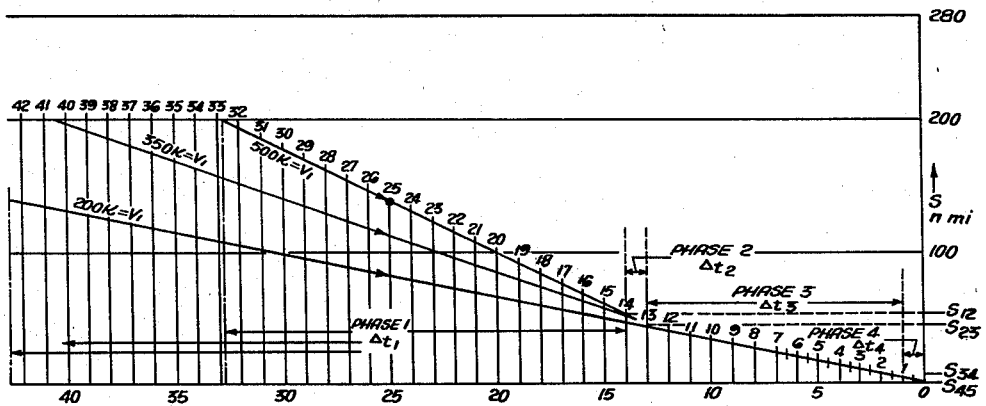

The system takes into account the aerodynamic characteristics of interceptor type aircraft which impose limitations. Thus the optimum speed on a minimum fuel consumption per mile basis varies with altitude. The system is able to accept aircraft having different speeds and altitudes and to bring them in, in accordance with a predetermined schedule. This is accomplished in a minimum time consistent with operational requirements, including fuel economy. In this respect, as indicated above and in Figure 2, different phases, namely phases 1, 2, 3 and 4 are considered in obtaining a general representation of the (TTA) time to arrival of an aircraft following an ideal flight track of constant N as outlined above. Thus, in phase 1 as represented in Figure 4, this phase is a high altitude phase which is remote from the point of entry, point A, into the GCA gate. The quantity S is used to represent the distance from any given aircraft position to the GCA gate, point A, measured along the planned flight path. It is the distance used for scheduling computations. In the N, S coordinate system, the quantity S is identical with the S cordinate. In the R, theta coordinate system, the quantity S has a definite relationship to the R and theta coordinates when ideal flight tracks are flown. In phase 1, the flight variable which changes most is the quantity S. For this reason phase 1 is also identified as the delta S phase. Phase 2 is characterized by speed reduction in which the speed of the aircraft is reduced in predetermined amount and is designated by the symbol delta V. Phase 3 is that part of the approach pattern in which the aircraft descends to the proper altitude for entry into the GCA gate. Phase 3 is thus designated by delta Z. This quantity Z, the aircraft altitude coordinate is obtained from the track while scan (TWS) radar. Phase 4 is charcterized mainly by changes in the N coordinate as the aircraft changes its heading at a constant rate by a total amount equal to its original N coordinate value and for that reason the phase may be characterized as the delta N phase. A fifth phase, illustrated as such in Figure 2, is recognized and is characterized by a straight line flight which continues over a distance determined by the length of time needed to bring the aircraft close to its ideal schedule position so that it enters the GCA gate with not more than the allowed scheduling error. To summarize this symbolic representation of flight path phases, there are phases 1, 2, 3, 4 and 5, corresponding respectively to the delta S phase, the delta V phase, the delta Z phase, the delta N phase and the final phase which has been described.

The time to arrival (TTA) of the aircraft at the GCA gate as represented in Figure 4 equals the sum of the individual time intervals required for the aircraft to pass through the several phases defined above. Delta $t$ for the first phase is given in the expression:

$$\Delta t_1 = \frac{(S_a - S_{12})}{V_1}$$

In this expression $S_a$ is used to designate the actual S coordinate of the aircraft to distinguish it from the ideal aircraft coordinate, $S_i$, which will be discussed later. $S_{12}$ represents a particular value of the S coordinate which marks the boundary between the delta S and the delta V phase.

The time interval associated with the second phase, the delta V phase, may be represented by the expression:

$$\Delta t_2 = \frac{V_1 - V_3}{a_2}$$

Where $V_1$ is the aircraft speed during the first phase, $V_3$ is the reduced speed existing during the third and subsequent phases and $a_2$ is the acceleration (negative and assumed constant) during the second phase.

The third term in the expression for TTA is delta $t_3$. This term is given by the expression:

$$\Delta t_3 = \frac{Z_2 - Z_4}{d_3}$$

Here $Z_2$ is the altitude at which the aircraft operated during phase 2, and $Z_4$ is the constant altitude during phase 4 and subsequent phases up to the point of entry into the GCA gate. The quantity $d_3$ is the rate of descent which is in the immediate neighborhood of 3000 ft. per minute, a standard value for this parameter.

During most of the delta N phase, the aircraft is turning at a standard rate $R_4$, e.g. 3° per second. The time interval delta $t_4$ will be given by the expression:

$$\Delta t_4 = \frac{S_{34} - S_{45}}{V_4}$$

Here $V_4$ is the aircraft speed during phase 4 and $S_{34}$ and $S_{45}$ are the boundary values of the S coordinate for this phase. Delta $t_5$ is given by:

$$\Delta t_5 = \frac{S_{45} - S_{56}}{V_5}$$

Here $V_5$ is the mean speed in phase 5. $S_{45}$ is the boundary between phases 4 and 5 and $S_{56}$ is the value of the S coordinate at the entry point to the GCA gate.

Summing these time intervals in one expression, there results:

$$TTA = \frac{S_a - S_{12}}{V_1} + \frac{V_1 - V_3}{a_2} + \frac{Z_2 - Z_4}{d_3} + \frac{S_{34} - S_{45}}{V_4} + \frac{S_{45} - S_{56}}{V_5}$$

An examination of this expression indicates that most of the change in the TTA occurs during phase 1 of the controlled approach. Assuming that all aircraft have the same speed in phase 3 and subsequent phases, it then becomes evident that in order to accommodate various speed-altitude combinations in a high density control system, the primary concern is with multi-speed problems in phases 1 and 2 of the approach pattern.

Referring to Fig. 2, it is noted that phase 2 corresponds to the $S_{12}$ to $S_{23}$ interval. During this phase an aircraft traveling at a normal high altitude (e.g. 39,000 ft.) with an arbitrary speed, (e.g. 500 knots) requires approximately one minute to decelerate from 500 knots to 200 knots speed reduction commencing at the point $TTA = 14.0$ minutes, $S = 45$ nautical miles. It is assumed that the aircraft slows down at a constant acceleration. Now assume that the speed of the aircraft had been appreciably different from 500 knots, e.g. 350 knots. It is desirable to schedule the low speed aircraft with a minimum of complication to the instrumentation required for a single speed system. To accomplish this the quantity $S_a - S_{12}$ is multiplied by the ratio of normal system speed (for which the ideal coordinate generator is specifically designed) to the actual speed of the aircraft. This has the effect of changing the denominator of the delta $t_1$ term of the TTA expression from the original or nominal system speed to the speed of the particular aircraft being controlled. Thus the delta $t_1$ interval associated with the ideal coordinate generator corresponds to the delta $t_1$ interval actually being developed by the slow speed aircraft. It will be shown later in the discussion of practical instrumentation for the ideal coordinate generator, designated as such in Fig. 6, the manner in which provision can be made for smooth merging of a low altitude, low speed aircraft into the nominal flight path of the system. This merging occurs most conveniently and economically at the point where the actual altitude of the aircraft approaching at less than the standard height becomes equal to the altitude of the "standard" aircraft, i.e., at some point on the descent cone.

For the purposes of instrumentation it is desirable to transform the N, S system of coordinates outlined above into a system involving the above-mentioned R and theta coordinates it being noted that the ideal paths followed by aircraft are the same as in the previously outlined system. However, instead of having two points of origin, namely, the centers of each of the two turning circles, only one origin is involved. This single origin point is the point of entry into the GCA system, namely, the point A in Figure 2 and Figure 5. The polar coordinates of an aircraft are computed, as described in more detail hereinafter, relative to this origin, from information supplied by the TWS radar. From these polar coordinates, an angle, epsilon, is determined. When this angle epsilon is added to theta, a direction of flight is established such that motion of the aircraft is along one of the aforementioned idealized flight tracks, i.e., a track 9 identified by a constant value of N. In such case, the angle psi is defined as the angle which the ground velocity of the aircraft makes with the theta equals 0 direction when an ideal flight track is being followed. The following mathematical relationship is derived with the aid of Figure 5:

$$\psi = \theta + \epsilon + 180°$$

It may be shown that the angle epsilon is given by the following expression:

$$\psi \text{ (psi)} = \theta \text{ (theta)} + \epsilon \text{ (epsilon)} + 180°$$

$$\epsilon \text{ (epsilon)} = \sin^{-1}\left(\frac{R_n \cos \theta}{\sqrt{n}}\right) - \sec^{-1} \sqrt{n} - \theta$$

$$n = R_n^2 + 1 - 2R_n \sin \theta$$

$$R_n = \frac{R}{a}$$

In this expression $a$ is the radius of the turning circle 10 or 11.

The function epsilon versus theta is plotted for various constant values of $R_n$ in the graphical representation of Figure 13. Also shown in Figure 13 is a family of parallel straight lines, superposed on the epsilon versus theta curves, which define loci of constant values of N according to the relation:

$$N = \theta + \epsilon$$

The straight line locus, epsilon=theta, defines points on the turning circle. Information presented in Figure 13 also may be represented in the form shown in Figure 14, where the function epsilon=$f(R_n, N)$ is plotted. One curve for each of several constant values of N is shown. This type of a functional representation serves as a starting point for an analog computer, i.e., a function generator which, given an analog input consisting of a reference or ideal value of N and a relative range $R_n$, delivers at its output the function epsilon. This, together with the instantaneous value of the theta coordinate, determines the directional part of the aircraft ground velocity vector required to fly an ideal approach track according to the equations written above.

For an aircraft following an ideal path along a track of constant N, $$\frac{dN}{dt} = 0$$

$$\frac{d\theta}{dt} + \frac{d\epsilon}{dt} = 0$$

Since N=theta+epsilon the relation:

$$\dot{\theta} + \dot{\epsilon} = 0$$

holds true. For example, an aircraft at R=10 mi. (a=1.0 mi.) at a speed of 240 knots, flying an ideal track (e.g. N=90°) has $$\frac{\Delta \epsilon}{R} = 1°/\text{mile}$$

Since at 240 knots, $$\frac{\Delta R}{\Delta t} = 4 \text{ miles/minute}$$

there results $$\frac{d\epsilon}{dt} = 4°/\text{min.}$$

This is a quantity which is observable with some precision and is therefore used at moderate and short ranges as a basis of closed loop heading control. One control technique consists of comparing theta and —epsilon at the traffic control center and sending a corrective "change heading" signal to the aircraft. This is independent of speed and scheduling control. When the aircraft reaches the turning circle 10 or 11, indicated by the advent of the condition theta=epsilon, a sense reversing switch operates and generates corrective "change heading" signals based on the relation theta=+epsilon which obtains on the turning circle.

If it is desired to operate without a reference value of N the angle epsilon is obtained directly from R, theta and $a$. Figure 15 shows a family of epsilon versus $R_n$ curves for each of which theta has a constant value. This form of the epsilon, R, theta, $a$ function serves readily as a starting point for an analog computer. No "N" memory is required. Epsilon+theta=0 is the basic relation which, when maintained by the heading control loop, insures that an ideal flight path is followed. If the epsilon+theta=0 control loop fails to function perfectly, i.e. so that an appreciable drift from one ideal path over to an adjacent ideal path occurs, no complications result. The system constrains the aircraft to approach on that ideal path on which it happens to be located from then on to the point of entry into the GCA gate. At any instant the ideal path which the aircraft finds itself on may be determined by a simple summer computer which forms the quantity N=theta+epsilon.

It may be demonstrated that the relation between $S_n$ (the relative distance along any ideal flight track from present position to the origin of coordinates, measured in units equal to the radius of the turning circle), and the related variables may be put into the form, $$S_n = (N - \sin N) + R_n \cos (N - \theta)$$

where $S_n = S/a$. In Figure 16 this relation is plotted as the $S_n$ versus R family of curves. Another set, $\Delta\lambda_n$ versus $R_n$ is also plotted. $\Delta\lambda_n$ is defined by the relation:

$$\Delta\lambda_n = S_n - R_n$$

$\Delta\lambda_n$ is the amount by which the relative distance along an ideal flight track, $S_n$, exceeds the value of the relative range $R_n$. A second analog function generator suggests itself capable of producing $\Delta\lambda_n$ from an input consisting of $R_n$ and N is an essential item in a "relative schedule distance computer," whose function is to evaluate $S_n$ from the available data. It should be noted, in Figure 13, that values of $R_n$ less than 2 may correspond to points on the turning circle, whereas values of $R_n$ greater than 2 always correspond to points outside the turning circle.

It is believed that instrumentation of a coordinate transformation computer as part of a control system for obtaining ideal flight paths could be carried out more simply starting with R, theta aircraft coordinates rather than with X, Y, Z coordinates. Since the TWS radar extracts aircraft positional information initially in the R, theta form, this offers possibly an additional element of simplification. When no memory storage is provided for N, then an "N-reference-generator" is not required. Heading control on a theta+epsilon=zero basis is simply instrumented. Scheduling control involving comparison of the actual S coordinate to a desired or reference value involves in such case comparable complexity whether a single origin (R, theta) coordinate system or a dual origin (N, S) system is used. In either case the distance along the non-radial flight track is found, involving essentially a computation of the quantity S.

Before discussing details of the computer illustrated in connection with Figures 6, 7, 8, 9 and 11, the system parameters are first postulated and they include such variables as operating speeds, altitudes, ranges, and associated errors, as well as aerodynamic characteristics of the controlled aircraft.

On the basis of available information concerning jet aircraft characteristics in particular, and operational practices in general, the following specific values of system parameters are used for exemplary purposes, it being understood, of course, that the present invention is capable of being practiced without adhering strictly to the magnitude of these parameters. A standard turning rate of 3° per second, a standard descent rate of 3000 ft. per minute, and a standard speed of approximately 500 knots at 39,000 ft. is assumed. A speed of 200 knots during the descent from 39,000 to 3,000 ft. (the normal altitude for entry into the GCA gate) is assumed. At this speed, the turning circle radius is approximately 1 nautical mile. This corresponds to an acceleration of 57% of the gravitational constant. Also, it is assumed, for the purposes of discussing control-loop parameters, that the aircraft is capable of responding to speed change commands as great as plus or minus 30 knots. On the basis of these parameter values, Figure 4 has been constructed. Figure 4 indicates that phase 4, the delta N phase, lasts for 90 seconds and is extended over a distance, measured in the S direction, of 5 nautical miles. This allows approximately 2 nautical miles of straight line level flight before an aircraft having the largest permissible value of N enters into the 3° per second turn. For aircraft which are approaching at values of N less than pi radians, the straight line level flight part of this phase is somewhat longer.

Phase 3 is shown in Figure 4 as extending from S=4 nautical miles to S=44 nautical miles, the corresponding TTA values being 1 minute and 13 minutes, respectively. This corresponds to 12 minutes of elapsed time for the delta $t_3$ interval (delta Z is equal to 36,000 ft. at a rate of 3000 ft. per minute). Phase 2 extends, in this example, from a value of S=44 nautical miles to S is equal to 50.8 nautical miles. This corresponds to an elapsed time (delta $t_2$) of 1 minute. Phase 1 for a 500 knot aircraft entering the system at S=200 miles, extends over an interval of time (delta $t_1$) from $TTA$=32.7 minutes to $TTA$=14 minutes, which is equal approximately to 19 minutes. When a 200 knot plane enters the system at $TTA$=42 minutes, it is a distance of S=140 nautical miles. In those instances where it is desired to accommodate low speed aircraft out of 200 nautical miles, then the ideal coordinate generator, described in connection with Figure 9, is adjusted to furnish reference coordinates over a time interval greater than that shown in Figure 4.

Figure 19 shows the overall system. Data with respect to each aircraft obtained from TWS radar unit 23 is applied sequentially from the sequential data unit 25. Such data with respect to each aircraft is in the form of voltages representing the three coordinates of the particular aircraft and a voltage representing the speed of the particular aircraft. Also applied from unit 25 are appropriate synchronizing signals for performing a switching operation electronically as described hereinafter. Such data with respect to the aircraft is applied sequentially from unit 25 to the coordinate transformation computer and the speed normalization computers 22 and 26. The data from this unit 22, 26 is stored in the storage units 301, 302, 303, etc. there being a storage unit for each aircraft to be controlled. The data thus applied to the storage units from the units 22, 26 is applied through an electronic switch having the general reference numeral 305, such electronic switch 305 being operated in synchronism with synchronizing pulses or other type of synchronous tie 27 in timed relationship with the data supplied from the TWS radar.

It is observed that there is an ideal coordinate generator 33, 34, 35 and flight command computer 36, 37, 38 for each aircraft to be controlled. The ideal coordinate generator develops ideal coordinates for flight along a constant N path or track. The output of one of the storage units 301, 302, 303 is applied to a corresponding ideal coordinate generator 33, 34, 35 by switching means 39 which is operated manually at the time the corresponding aircraft is "acquired." In acquiring the aircraft at the time it enters the system at a distance, for example 200 knots, the operator generally makes a comparison between the coordinates developed by the ideal coordinate generators 33, 34, 35 with the actual coordinates of the aircraft as indicated in the corresponding storage unit 301, 302, 303 and then interconnects the particular storage unit in which the coordinates most nearly match and thereby brings the acquired aircraft under the control of the system. The actual aircraft coordinates are effectively compared with the ideal coordinates and error signals developed in the corresponding flight command computer 36, 37, 38 are transmitted over a radio link to an automatic piloting system in the aircraft to control its flight path and its speed. Such radio link is designated in Figure 19 by the multi-channel modulator and transmitter unit 54.

The computer, illustrated in connection with Figures 6, 7, 8, 9, 10, 11 and 12, performs essentially four different functions as indicated in the block diagram of Figure 6. These four functions are: coordinate transformation, speed normalization, ideal coordinate generation, and flight command computation.

The coordinate transformation computer 22 receives data in the form of X, Y and Z coordinates of the aircraft position from the conventional TWS radar 20. Since this radar is located at the point 6 in Figure 5 remote from point A, the coordinate transformation computer 22 is supplied also with quantities $b_1$, $c_1$, and gamma$_1$ which correspond as indicated in Figure 5 to the coordinates of the radar situs 6 and the orientation of the data received with respect to the line AB. Thus, the computer 22 receives the rectangular coordinates of the turning circle with respect to the TWS radar origin 6 having coordinates $b_1$ and $c_1$. The angle between the landing strip and the positive X axis of the TWS reference frame gamma$_1$ is another item of input data. The output of the computer 22 consists of the specialized coordinate $N_a$ times A as well as $S_a$ which uniquely describes the location of the aircraft. The coordinate $S_a$ is the distance the aircraft is required to travel to reach the GCA entering gate, namely point A. The coordinate $N_a$, although basically a position coordinate for locating the aircraft, is related also to the aircraft heading when the controlled aircraft is flying any one of the standard optimized flight paths of constant N.

The ideal coordinate generator 24, which includes a series of units represented by the units 33, 34, 35 in Figure 19, develops voltage analogs of ideally varying N and S coordinate sets for twenty-five aircraft simultaneously, although for purposes of simplicity apparatus for only three sets is referred to. These serve as reference coordinates to which actual, normalized coordinates are compared. These ideal coordinates are generated according to a common system schedule. Corrective flight commands based on this schedule result in controlled aircraft flight along optimized flight paths. The input to the generator 24 is $Z_a$, the actual altitude of the aircraft developed from data supplied from the TWS radar 20. The output of the generator 24 constitutes $Z_i$, an ideal or command altitude, $N_i$ times A, the ideal heading command, and $S_i$ the ideal distance command.

The speed normalization computer 26, alters the actual S coordinate of an aircraft in a manner which compensates for the difference between the actual ground speed of the controlled aircraft and the "system" speed for which the generator 24 is developing reference coordinates. Input data to the computers 26 consists of the actual S coordinate, $S_a$, its ground speed $V_g$, supplied from the TWS radar. Also, supplied to computer 26 is the quantity $S_{12}$ which is the value of the S coordinate marking or defining the boundary between phases 1 and 2 of the standard flight pattern. The quantity $V_n$ is an adjustable quantity and is the reference speed, i.e., establishes the "system" speed. The output of the computer 26 comprises $S_{an}$ and $V_a$. $S_{an}$ is a normalized quantity and is variable for comparison with the ideal S coordinate, namely $S_i$. Normalization of the S coordinate with respect to speed is used to solve problems associated with: (a) speed limitations due to fuel economy aerodynamic factors; (b) head and tail wind compensation for correct arrival time calculation and control requirements; (c) crippled aircraft which are unable to follow the standard speed-altitude pattern; (d) simultaneous control in the system of aircraft having different operating characteristics.

The flight command computer 28, which includes individual units 36, 37 and 38, functions generally to accept actual and ideal values of aircraft coordinates and generates error signals accordingly. Operation on these error signals according to accepted or conventional closed-loop-control principles results in degenerative speed control and heading control signals. These are transmitted to the aircraft via radio links.

The computer 22 consists of high-speed electronic-analog units permitting rapid solution for the quantities $S_a$ and $N_a$ times A in terms of the input data. When the information from the TWS radar is in sequential form, no switch at the input to the computer 22 is required. Switching devices 30 and 32 are employed to transfer the modified N and S coordinates to the appropriate or corresponding "per channel" computer in the flight command computer 28. Before sending the S coordinate information to the computer 28, an additional operation is performed on it, namely speed normalization for purposes mentioned above. This operation of speed normalization is performed at high speed also, i.e., on a time sharing basis.

The steps involved in converting the information supplied by the TWS radar unit 20 (which is assumed to be in rectangular coordinate form) to the N, S and V form are as follows: first, the TWS data is referenced to a new origin which is located at the center of the proper or corresponding turning circle. This is accomplished by subtracting the rectangular coordinates of the center of a turning circle with respect to the origin of radar situs 6, from the X and Y components, respectively. The next step is to convert this azimuthal information from rectangular to polar form. Involved in this process are the algebraic operations of squaring, adding, extraction of square root and extraction of the polar angle. Rotation of the polar angle zero reference is effected to compensate for tilt of the runway with respect to the positive X axis of the TWS installation. This corresponds to adding some angle, $gamma_1$, characteristic of the system as a whole, to the polar angle referred to above.

Figure 3:
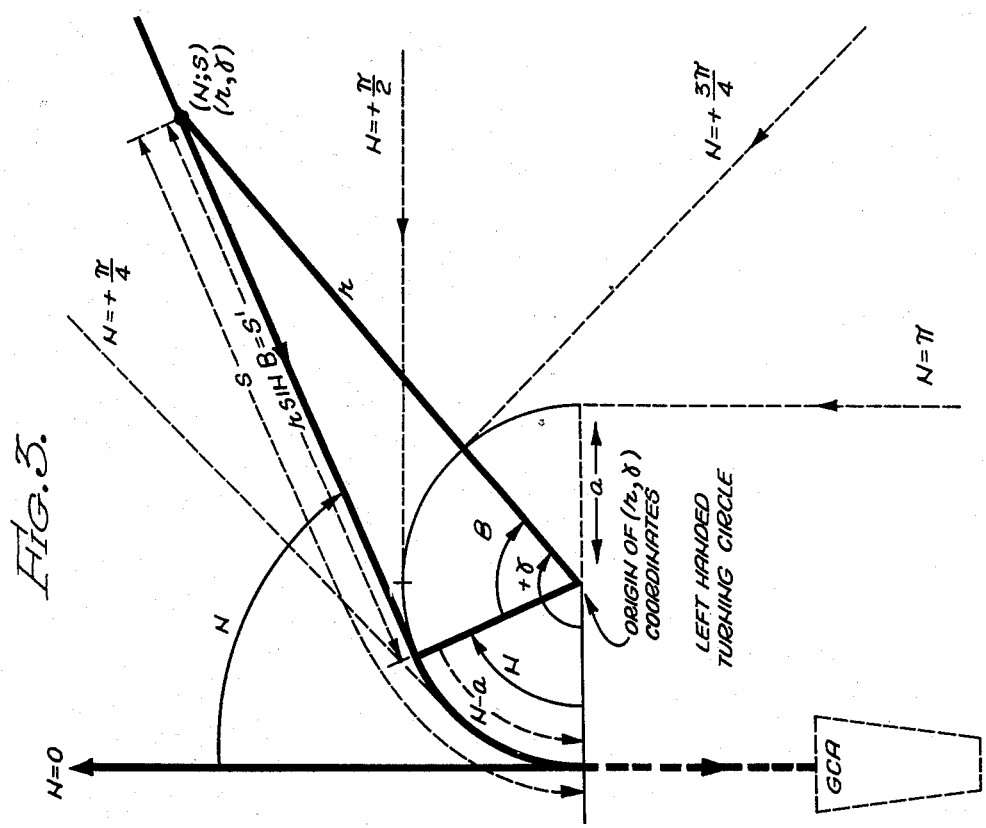

Figure 3 shows a straight line portion of the flight track 9. This is conveniently related to the range from the new origin by the relation: $S'=R$ times sin beta. This quantity, when added to the quantity N times A, becomes the S coordinate. To determine N, it is necessary to subtract from the polar angle, gamma, the angle beta. The angle beta is an important quantity in this transformation and serves to relate on the one hand the polar angle gamma and the N coordinate, and on the other hand it relates simply the range from the center of the turning circle R, to the length $S'$, of the straight line part of the flight track. In order to determine the angle beta, an inverse trigonometric computation is performed. For this purpose, a convenient function and one which is possible to generate using analog computers, is represented by the expression:

$$\beta = \sec^{-1} \frac{r}{a}$$

Figure 7:
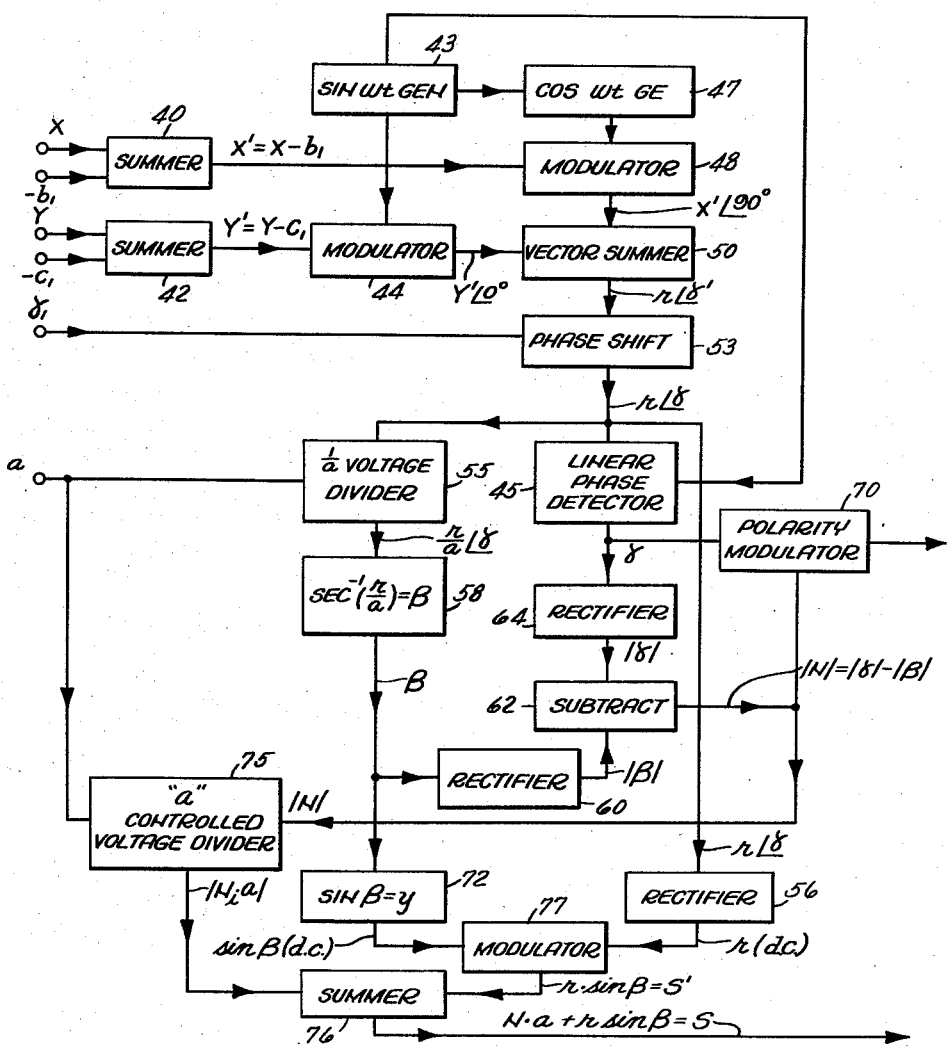
Figure 7 is a block diagram illustrating the components in the so-called coordinate transformation computer which is designated as such in Figure 6.
Figure 10:
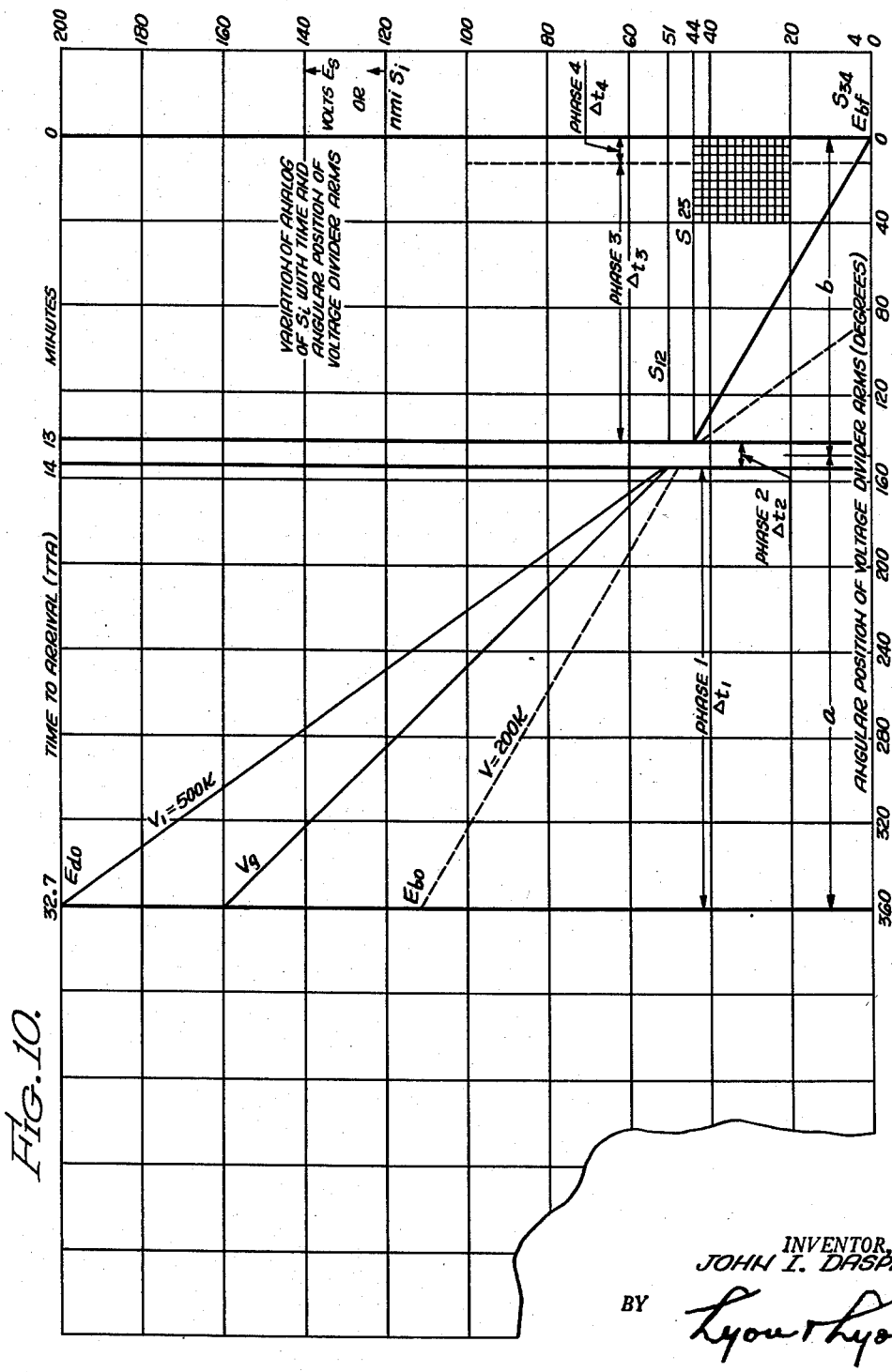
Figure 10 is a graphical representation for purposes of illustrating the functioning of the ideal coordinate generator illustrated in Figure 9.

The means and techniques whereby this inverse trigonometric function operation is performed is described hereinafter. To form the quantity $N.a$ as shown in Figure 7, the mathematical operation of multiplication is performed. Since $a$ is the radius of the turning circle and is thus a quantity which will not change rapidly, it is possible to accomplish this by means of a simple electromechanical expedient, e.g., a voltage divider, which is manually or automatically controlled. The operation of producing the quantity sin beta can be accomplished in a number of ways. Choice of the optimum realization rests on a number of factors such as speed and precision requirements, etc. The process of multiplying the time varying quantity, sin beta, by the time varying quantity $r$, is a more difficult multiplication and is accomplished as shown in Figure 7. The last step in the transformation $s$ the algebraic addition of the quantity $N.a$ to the quantity $r.\sin$ beta to get the S coordinate. The computation of N, S coordinates is seen to involve quite a few operations which, if done with highly conventional electromechanical components (and a $\sec^{-1}$ computer based on such devices) would require one complete set of computers for each of the twenty-five channels. It is desirable from some aspects to perform the above operations completely on a high speed all-electronic basis, i.e., fast enough to permit time sharing of the computer 22 by the several channels.

Figure 6:
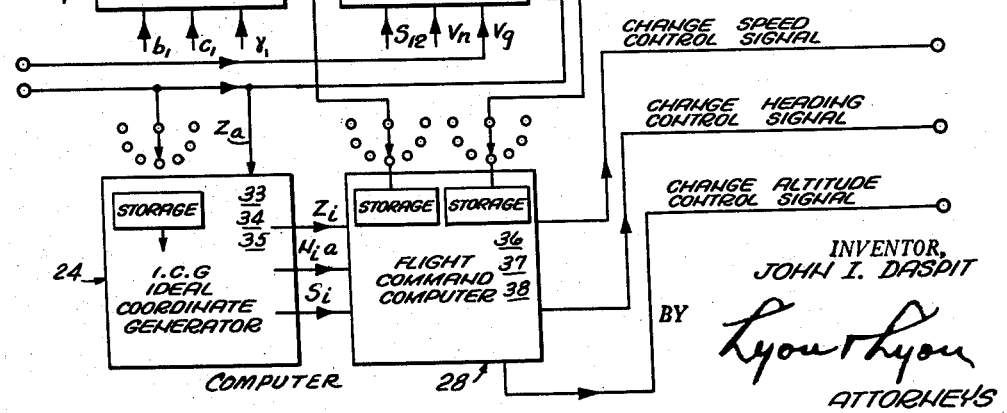
Figure 6 is a block diagram of the computer which serves to develop control signals for the aircraft in accordance with data received from the groundbased radar system indicated in Figure 5.

Referring to Figure 7, which shows details of the coordinate transformation computer 22 designated as such in Figures 19 and 6, the X and $b_1$ coordinates are added in the summer 40 which as is well known may constitute a simple resistance network. Likewise, the Y and $-c_1$ coordinates are added in the summer 42. The sine wave generator 43 develops sine waves having a frequency lying, for example, in the range of 1 to 10 kilocycles, and the output of the generator 43 is applied, on the one hand to the modulator 44, and on the other hand to the linear phase detector 45. The modulator 44 is linear and performs a desired multiplication. It is understood that the term "modulator," for the present purposes, is considered synonymous with the term "multiplier." It is noted that also the output of the generator 43 is applied to the generator 47 to develop a corresponding cosine function and that the output of the generator 47 is applied to the modulator stage 48 for effecting a multiplication. The output of both modulators 44 and 48 are added in the vector summer 50 which as is well known may comprise simply a pair of resistances for effecting a vector addition. The output of the vector summer 50 is applied to the phase-shifting network 53 to produce a phase shift in accordance with the quantity $gamma_1$.

The linear phase detector 45 serves as a phase discriminator and is preferably of the character described and claimed in my Patent No. 2,758,277 assigned to the same assignee as the present assignee.

The phase-shifted voltage output of stage 53 is applied, first, to the linear phase detector 45, second to the voltage divider stage 55 and thirdly to the rectifier 56. The voltage divider 55 may comprise simply a potentiometer type resistance having its adjustable tap adjusted in accordance with the desired value of $a$, the radius of the turning circle. The combined output of the voltage divider stage 55 is applied to a biased diode function generator 58, described hereinafter, for developing the indicated secant function. This biased diode function generator is indicated by the block 58 in Figure 7. The output of the stage 58, the quantity beta is rectified in the rectifier 60 and applied to a subtraction network 62 to which is also applied for subtraction purposes, the rectified output of the linear phase detector stage 45, the last-mentioned rectification being accomplished in rectifier 64.

The quantity gamma, which is the output of the phase detector, is either positive or negative, depending upon its phase and such quantity gamma is applied to the polarity modulator stage 70. Also applied to the modulator stage 70 is the absolute magnitude of the quantity N. The polarity modulator stage 70 functions to develop an output which is N of a polarity determined by the polarity of the quantity gamma. The polarity modulator stage 70 is essentially an electronic switch which operates in accordance with the polarity of gamma.

The quantity beta developed in the stage 58 is applied also to another biased diode function generator stage 72, of the character described hereinafter, for developing the function, sin beta.

The potentiometer type voltage divider 75 has applied thereto the absolute magnitude of the quantity N, the tap on such potentiometer type resistance being adjusted to a position determined by the desired value of $a$, the radius of the turning circle. The output of the voltage divider 75 is applied to the adding or summer network 76 used for combining or adding thereto the output from the linear amplitude modulator stage 77. The stage 77 has applied thereto the output of stage 72 and the output of stage 56.

Thus, the output of the coordinate transformation computer is the quantity N and S as noted in Figures 6 and 7.

The ideal coordinate generator 24 is now described in relationship to Figures 4, 6 and 9. An inspection of Figure 4 discloses that in each phase, the function S versus $p$ varies with time in a linear manner. The generation of functions of that character is accomplished using linear voltage dividers, the movable arms of which are driven at constant angular speed. Each channel corresponding to units 33, 34, 35 in Figure 19 has incorporated therein a pair of voltage dividers 90 and 91 (Figure 9). One divider for each standard aircraft speed (excluding the varying speed of phase 2) provides uniformly varying voltage analogs of S. For example, in phase 1, assuming an analog scale of 1 volt per nautical mile, a linear variation of voltage over a range extending from 200 volts to 51 volts is provided. This variation is of constant slope over the corresponding time interval delta $t_1$, as shown in Figure 4 and in Figure 10. For phases 3 and 4, the slope is, in general, different from the slope in phase 1. A practical value of slope for phases 3 and 4 is that corresponding to an aircraft speed of 200 knots. Thus, during delta $t_3$ and delta $t_4$ a potential difference is supplied from the ideal generator varying from 45 analog volts at the beginning of the delta $t_3$ interval to 0 volts at the end of the delta $t_4$ interval. During phase 2, nonlinear variation of the voltage analog of S with respect to time is required. The manner in which such nonlinear variation is produced is described hereinafter.

Figure 9 shows details of one form of ideal coordinate generator. The voltages available at the movable taps of the dividers 90 and 91, respectively, are analogs of the ideal S coordinate in phase 1 and in phases 3 and 4. The movable taps of the potentiometer type resistances 90 and 91 are ganged for unicontrol and are thus simultaneously rotated at a predetermined speed. The interval required for the movable taps or arms to sweep through 360° corresponds to the time during which an aircraft is under control, i.e., from the time of entering into the system at 200 nautical miles range to the time of entry into the GCA gate. It is noted that each of the ideal coordinate generators incorporate dividers 90 and 91 and that the taps on each are driven at the same synchronous speed, but the set of taps in each ideal coordinate generator 33, 34, 35 is "staggered" with respect to sets in the other generators for scheduling purposes. Thus, for example, while the dividers in one generator are developing voltages corresponding to a predetermined area or zone in phase 1, the dividers in a different ideal coordinate generator are developing voltages corresponding to a predetermined area or zone in the same phase 1 or in a different phase such as in a predetermined area or zone in phase 2. Thus, collectively, voltages are being developed by the dividers 90, 91 in all of the ideal coordinate generators in a corresponding number of areas or zones, and these areas or zones effectively move in accordance with movement of the rotated taps on resistances 90 and 91. In other words, the voltages developed at the corresponding taps 90A and 91A, respectively, of voltage dividers 90 and 91 are each representative of a particular zone or area and these voltages are progressively changed since the positions of such taps are progressively changed. Since these voltages thus represent zones, variation of such voltages corresponds to variation or movement of the zones represented by such voltages. Scheduling of the flight of aircraft is thus accomplished due to the staggered relationship of the movable taps on resistances 90 and 91, and one aircraft is thus assigned to a corresponding zone, as described above in connection with Figure 19, and maintained essentially midway in such zone by the control signals transmitted thereto. The rate of change of potential from divider 90 is adjusted by adjusting the values of the voltages applied at the ends of the divider ($E_{a0}$ at the entry end and $E_{af}$ at the other end) to correspond to the desired system or "nominal" speed of aircraft during phase 1. Similarly, voltage divider 91 has the voltages applied thereto so adjusted to give a range of change of the S analog which corresponds to the system speed during phases 3 and 4.

When the voltage $P_a$ developed on tap 90A is greater than the voltage $P_b$ (the voltage developed on tap 91A), the former quantity, namely $P_a$, controls the output $S_1$ developed on the interconnected cathodes of the diodes 94 and 95. This situation prevails during the interval represented by delta $t_1$ in Figures 4 and 10. When the voltage $P_b$ exceeds the voltage $P_a$, the output $S_1$ is equal to the potential $P_b$. This latter condition occurs during phases 3 and 4. During the transition interval, namely during phase 2, the diodes 94 and 95 effect a smooth transition from the $V_1$ slope to the $V_3$ slope. The exact shape of the function $S_1$ versus $t$ during this phase is established by the effective diode resistance. The duration of this phase is one minute for the assumed value of system parameters. The corresponding interval in $S_1$ is approximately 6 nautical miles. The location of this region is $S=45$ nautical miles (22 minutes at 200 knots). Thus, a considerable interval of time remains in which schedule errors which may be reduced to a tolerable value estimated to be of the order of + or − 4 seconds. The resistance 94 has a resistance value very much larger than the source impedance determined by the voltage dividers 90 and 91. This prevents heavy loading of either one of the dividers and permits a linear resistance winding to be used.

Thus, this arrangement illustrated in Figure 9, in effect, solves the equation:

$$TTA = \text{delta } t_1 + \text{delta } t_2 + \text{etc.}$$

for a particular set of boundary conditions. At 0° rotation $S_1=0$, and at 360° rotation $S_1=200$ nautical miles.

Referring to Figure 3, it is noted that S′ which is equal to R times sin beta is that part of the approach which corresponds to a straight line flight path projection in the ground plane. As S′ decreases and becomes equal to 0, then S is equal to N times $a$. Since N times $a$ cannot be larger than pi times $a$, the $S_1$ generator already described is an N times $a$ generator for the range of S values from 0 to N times $a_{max}$. The output of the $S_1$ generator is limited so as to derive a quantity which starts to vary when S′ is reduced to 0.

The quantity $N_0$ times $a$, which is the arc equivalent of the reference value of N, is derived from the adjustable tap on the potentiometer type resistance 93. This signal is maintained constant during the early approach, and together with the action of diode 94, provides a value of ideal $N_1$ coordinate for the portion of the approach path wherein S′ is greater than 0. The potential on the cathode of diode 94, $P_3$, varies from its maximum value corresponding to 200 analog volts to some relatively small value corresponding to $N_0$ times $a$. For values of $P_3$ smaller than $N_0$ times $a$, the $N_1$ times $a$ output signal follows the potential variation of $P_3$ producing the desired variation in the $N_1$ times a coordinate. This corresponds to the proper constant rate of turn which exists while the aircraft is on the turning circle. Thus, there is available from the ideal coordinate generator a pair of coordinates describing the ideal position of the aircraft in terms of a distance $S_i$ and the quantity $N_i$ times $a$ which is also a distance. The reason that the $S_i$ generator can be used as the generator of the quantity $N_i$ times $a$ is that $S_i$ is generated as a linear function of time during the delta N phase. When $Z_i$, the ideal altitude coordinate, is a linear function of time during phase 3, the $Z_i$ analog function is generated from the value of the $S_i$ voltage variation in the manner indicated using the apparatus illustrated in Figure 9 including the cathode follower 98 and biased diodes 99A, 99B and the diode 99C.

It is noted that the quantity $Z_{a0}$ is the adjusted value of voltage appearing on the tap of the potentiometer resistance 96. $E_{ao}$ is the voltage on the tap of resistance 90E. $E_{af}$ is the voltage on the tap of resistance 90F. $E_{bo}$ is the voltage on the tap of resistance 91E. $N_0.a$ is the voltage on the tap of resistance 93, all of such taps mentioned in this paragraph being adjustable. The quantity $V_a$ has a variation as indicated as a function of $Z_a$ to take care of different characteristics of the aircraft so that the aircraft is flown at the optimum speed for the particular altitude.

The network comprising resistance $R_8$ and $C_1$ is a differentiating network connected to the cathode of tube 98 to develop a control voltage which takes effect on and slightly before the aircraft reaches the turning circle. The resulting voltage $V_n$ is applied to the cathode of the diode 99D to effect the desired change in $V_1$.

In similar fashion, the desired variation is imparted to $Z_i$ which is initially the value of $Z_{a0}$, but after a particular value of time, after $P_3$ has decreased to a predetermined value, the diode 99A is rendered conductive at a value determined by the setting of the tap on resistance 99P, i.e., at voltage $P_4$ to cause the value of $Z_i$ to decrease. $Z_i$ thus decreases with time, i.e., with decreasing values of $P_3$, to a minimum which is determined by the setting of the tap on resistance 99R, i.e., voltage $P_6$. After this condition is reached, and the value of $P_3$ decreases further as time progresses, the value of $Z_i$ remains substantially constant. For these purposes the resistance 99S which is connected between the cathode of tube 98 and the cathode of diode 99A is relatively large.

Similarly, the value of $N_i.a$ is initially equal to the value $N_0.a$ (when the aircraft is remote from the entry gate) but as the aircraft continues inwardly in its flight to such gate the value of $P_3$ decreases, tube 94 begins to conduct and the value of $N_i.a$ is decreased.

Figure 8:
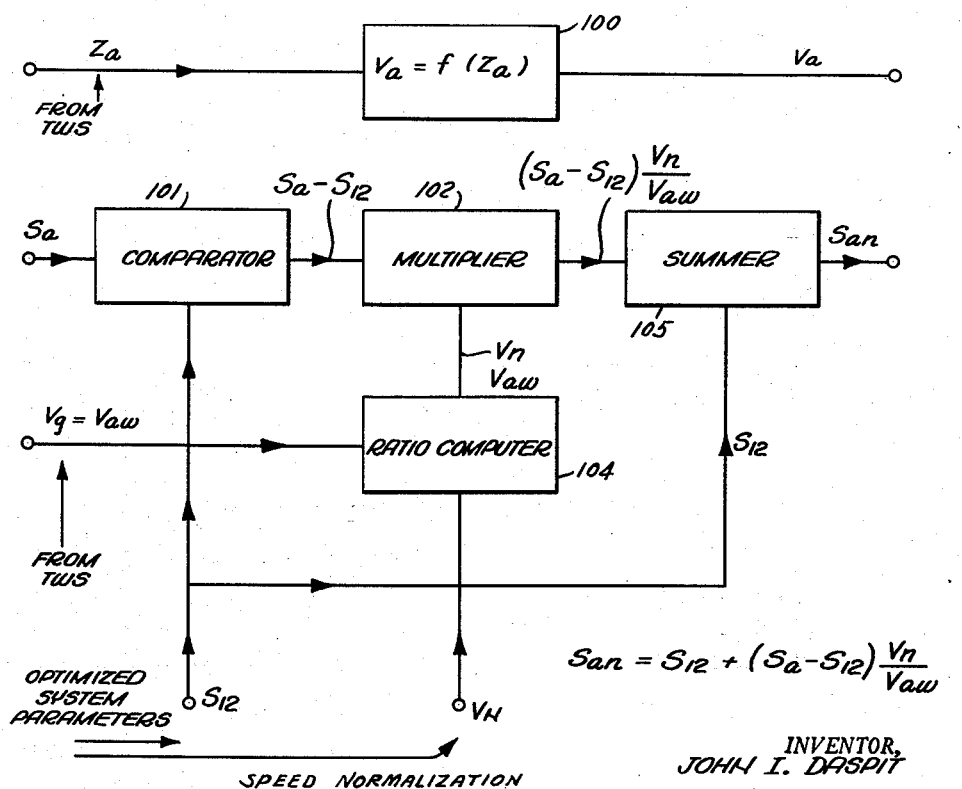
Figure 8 is a block diagram showing the components in the so-called speed normalization computer which is designated as such in Figure 6.

The speed normalization computer illustrated in Figures 6 and 8 is so designed that the ideal coordinate generator described above operates on the basis of a single aircraft speed, i.e., around a "nominal" or "system" speed. All aircraft, of course, do not have this actual speed. Entry into the traffic control system at lower than nominal altitude calls for a speed less than the nominal or high altitude speed mainly because of fuel economy factors. Crippled aircraft may have to come in at a reduced speed dictated by the extent of damages to the aircraft. Thus, some means are provided whereby the output of the ideal coordinate generator serves also as reference coordinate for aircraft operating at other speeds than the nominal system speed, $V_n$.

$$\Delta t_1 = \frac{S_a - S_{12}}{V_1}$$

The term, delta $t_1$ is recognized as an "actual" interval, delta $t_{1a}$, and $V_1$ is recognized as the actual ground speed, $V_{aw}$ of the aircraft. Thus, $$\Delta t_{1a} = \frac{S_a - S_{12}}{V_{aw}}$$

The ideal coordinate generator effectively defines an interval, delta $t_{1i}$, which is given by the following expression:

$$\Delta t_{ci} = \frac{S_i - S_{12}}{V_n}$$

where $V_n$ is the "nominal" speed of the system. The "on schedule" condition means that the actual interval, delta $t_{1a}$, has been constrained to be equal to the interval determined by the ideal coordinator generator, namely delta $t_{1i}$. Equating these two intervals gives the following relation:

$$\frac{S_a - S_{12}}{V_{aw}} = \frac{S_i - S_{12}}{V_n}$$

or $$S_i = S_{12} + \frac{V_n}{V_{aw}}(S_a - S_{12})$$

which is the "on schedule" condition for the general situation where $V_{aw}$ is different from $V_n$. It can be seen by inspection of the above equation that when $V_{aw}$ becomes equal to $V_n$, $S_i$ becomes equal to $S_a$. The speed normalization computer (SNC) accepts input data $S_a$, $V_n$, $V_{aw}$ and $S_{12}$ and forms the quantity:

$$S_{an} = S_{12} + \frac{V_n}{V_{aw}}(S_a - S_{12})$$

This quantity when compared to $S_i$ will produce S error signals which form a proper starting point for Flight Command Computation designed to reduce schedule error. A block diagram is shown in Figure 8.

Aerodynamic characteristics and fuel-economy factors define a relation between entry altitude and optimum air speed. The optimum air speed is computed mainly on a minimum-fuel-per-mile basis. The nature of this function, $V_a = F(Z_2)$, is represented as closely as desired by an analog function generator, e.g. of the biased-diode, multiple-chord-to-arc approximation type, which type is discussed hereinafter. A function block representing this relation is shown as part of the SNC diagram in Figure 8. The choice of optimum air speed could be left to the discretion of the pilot as an alternative to sending the $V_a$ command signal. Whatever the means for determining the optimized air speed there is some resulting ground speed which is a function of entry altitude and aircraft operating characteristics as well as other factors. Speed normalization of the $S_a$ coordinate permits any optimized speed-altitude combination to be handled by the ICG already described and by the Flight Command Generator which is described subsequently.

Referring more specifically to Figure 8, the quantity $Z_a$, the aircraft altitude, derived from the TWS radar is applied to the computer 100 of the biased diode type to produce the function $V_a$. The quantity $S_a$ as well as the optimized system parameter $S_{12}$ is applied to the comparator 101 which is either a resistance or vacuum tube network for purposes of adding to produce the output quantity $S_a - S_{12}$. This latter quantity is applied to the multiplier stage 102 constituting a linear amplitude modulation stage, although it is realized that a biased diode function generator could also be used for purposes of multiplication. The quantity $V_g$, the actual ground speed of the aircraft, which is equal to $V_{aw}$ is applied to the ratio computer stage 104 as well as the optimized system parameter $V_n$ for purposes of producing a mathematical division, i.e., to produce a normalization. The output of the ratio computer 104 is applied as an input to the aforementioned multiplier stage 102 and the output of such stage 102 is applied to the summer or adder stage 105, together with the quantity $F_{12}$. The output of the stage 105 is the quantity $S_{an}$.

A special technique is used for taking into account the existence of a strong head wind, or tail wind and this technique is now described. As described above, the primary control of an aircraft is effected only around the N control loop. This control constrains the aircraft to fly in a direction corresponding to the initial or entry value of the N coordinate. The value of $V_a$, the optimized air speed for the entry altitude is dictated by the traffic control system or might be determined by an altitude function of which all aircraft would have knowledge in advance and adhere to, if capable, without any specific command being given at the time of system entry. This so-called "N-loop-only-control" is continued until the quantity $V_{aw}$ is equal to $V_a+V_w$, the resultant ground velocity of the aircraft, is evaluated. The quantity $V_{aw}$, the magnitude and direction of which is then known, takes into account the wind whether it be a tail wind, a head wind, or a cross wind. The character of this quantity also appraises the system control officer that the aircraft which has recently entered the system is capable of maintaining the observed total ground speed $V_{aw}$. The magnitude of this resultant ground speed is recognized as the operating speed of the aircraft and normalization is carried out as already explained. Likewise, the computer discussed above, may effect the speed normalization of $S_a$ coordinate which normalization is required because of this aforementioned wind effect. The quantity $V_{aw}$ as indicated above, represents the ground speed of the aircraft with a corresponding air speed of $V_a$ and a wind speed, $V_w$. This ground speed is in the proper "N" direction for an optimum flight path. Assuming that the air speed $V_a$ during the "N-loop-only-control" interval is the optimum speed for the altitude of the particular aircraft, then the resulting known value of $V_{aw}$ is the proper speed to use for speed normalization. This quantity, $V_{aw}$, is thus used as the input to the ratio computer 104. The function generator 100 is used to generate an optimum air speed, $V_a$, as the function of the initial altitude and specific characteristics of the aircraft entering the system.

A crippled aircraft may be assigned a zone on the basis of the speed dictated by the damaged condition of the particular aircraft and/or other factors such as fuel reserve, pilot condition, etc. Whatever the resulting value of ground speed, $V_{aw}$, this may be taken into account by the process of speed normalization just described. If necessary, the crippled aircraft could be assigned some non-standard altitude by the system control officer if this were a desirable thing to do. To effect such non-standard speed altitude operation, the function generator 100, which normally computes optimum air speed is a function of entry altitude, may be replaced by an appropriate transducer. Alternatively, the altitude effect on speed as well as the altitude control may be accomplished manually by the system control officer. The important point which is emphasized is that speed normalization of the actual S coordinate, before comparison with the ideal S coordinate, and subsequent generation of flight commands, is a very useful technique and one which compensates for a variety of so-called non-standard situations.

Thus, aircraft having different optimum flight characteristics are scheduled by essentially the same computer equipment. Identification of the type of aircraft as well as the initial altitude determines the value of the quantity $V_a$ in the so-called "N-loop-only-control" interval. The speed during phase 3 and subsequent phases is equal for the several types if possible. Under these conditions no serious complications result from handling several different types of aircraft at the same time.

Figure 11 shows the general form of the flight command computer.

The $S_i$ and $S_{an}$ voltages in the form D.C., i.e., direct current voltages are applied to a resistance network for obtaining the difference between these two quantities, such network having the reference numeral 400 and has the output $eS$. This output voltage, a direct current voltage, is applied to each of the three networks 401, 402 and 403. The network 401 may comprise a voltage divider and has an output $K_1 eS$. The network 402 is an integrating network involving, for example, condensers to produce the indicated integrated quantity. The network 403 is a differentiating network and the output thereof is a differentiated quantity as indicated. The output of each of the networks 401, 402 and 403 is applied to a resistance summer network 405, for adding the above three mentioned outputs from stages 401, 402 and 403. The output of the network 405 is employed to modulate a radio frequency carrier wave which is transmitted to the aircraft for purposes of changing its speed, the modulation component of such carrier wave constituting a change speed control signal as indicated.

In similar fashion, the quantities $N_a$ times $a$ and $N_i$ times $a$ in the form of continuous voltages is applied to the differencing network 410 to obtain the difference quantity $eN$ times $a$ as the output of stage 410. This output quantity is applied to the stages 411, 412 and 413. The stage 411 may comprise simply a voltage divider and its output is applied to the summer network 414. The networks 412 and 413 constitute integrating networks and a differentiating network, respectively, and the output thereof is likewise applied to the summer network 414. Also applied to the summer network 414 is a control voltage from the so-called sense reversing switch 415. This switch 415 is controlled by a sensing voltage derived from the differentiating network 403. The output voltage of the stage 402 is applied to the switch 415 and appears with proper polarity, as controlled by the stage 403 to the summer network 414, the output of which is a change heading control signal used for purposes of modulating a high frequency carrier wave. Such carrier wave is transmitted to the aircraft which has an automatic pilot controlled by such signal after demodulation. The automatic pilot controlled by such signals steers the aircraft so that it flies along a path of constant N.

The quantities $Z_a$ and $Z_i$ are each applied to the differencing network 420, the output of which is a change altitude control signal likewise used for modulating a high frequency carrier which is transmitted to the aircraft.

It is noted that the aforementioned summer 405, besides having the three inputs mentioned above has a fourth input derived from the controlled gain amplifier stage 425. The gain of the stage 425 is controlled in accordance with the output voltage of the integrating network 402. The signal applied to the amplifier stage 425 constitutes, as indicated, a voltage which is the rate of variation, i.e., differential of the absolute value of $N_a$ times $a$. Differentiation of this quantity occurs in the differentiating network 427, and rectification of the signal $N_a$ times $a$ in the rectifier 430 produces a voltage which is, of course, the absolute magnitude of $N_a$ times $a$, as indicated.

The aircraft itself is in what may be termed to be a degenerative loop so that the control signal transferred thereto has the effect of minimizing the error signal to constrain the flight of the aircraft along a predetermined path.

Figures 17 and 18 illustrate the biased diode function generator for developing voltage variations of the character described in connection with elements 58 and 72 in Figure 7. The type of voltage variation in each case is one represented by a curve illustrated in Figure 18 which is concave in a downward direction.

For these purposes, a series of diodes 200, 201, 202, 203, 204, 205, 206, 207, 208 and 209, each having their anodes interconnected and their cathodes biased to different potentials, are used. The input voltage is applied between the terminals 210, 212 and the output voltage appears across the terminals 214 and 215, the terminals 210 and 215 being grounded. The anodes of each of the diodes is connected to terminal 214 and terminal 214 is connected to terminal 212 through resistance 217. The voltage source 216 has one of its terminals grounded and its positive terminal is returned to ground through the resistance 218 and the gaseous voltage regulating tube 219 serving to maintain a potential of approximately 105 volts across the leads 220 and 222. A series of voltage dividing networks 230, 231, 232, 233, 234, 235, 236, 237, 238 and 239 is each connected between the leads 220 and 222, and each of such voltage dividing networks has a corresponding adjustable tap 230A, 231A, 232A, 233A, 234A, 235A, 236A, 237A, 238A and 239A. These taps are connected through corresponding resistances 240, 241, 242, 243, 244, 245, 246, 247, 248 and 249 to corresponding cathodes of tubes 200, 201, 202, 203, 204, 205, 206, 207, 208 and 209. If desired, resistance 249 may have a value of 0 ohms. The resistances have the values indicated in Figure 7 and, in this respect, the symbol K refers to one thousand ohms and the symbol M refers to one million ohms. It is observed that resistance 217 has a value of 100,000 ohms, resistance 240 has a value of 4.7 megohms, resistance 241 has a value of 2.2 megohms, resistance 242 has a value of 2.5 megohms, resistance 243 has a value of 820,000 ohms, and so forth. It is observed that as the input voltage applied to terminals 210, 212 increases progressively more and more of the diodes 200—209 are, in that order, rendered conductive so as to produce an increased voltage drop across resistance 217. However, the voltage drop across resistance 217 does not increase linearly but increases in a nonlinear manner as shown in Figure 18. Various resistances are so chosen that the variation of output voltage appearing across the output terminals 214 and 215 has the desired variation, such variation in Figure 18 being the first 90° portion of a sinusoidal varying wave.

The arrangement shown in Figure 20 may likewise be used to develop change heading signals. In Figure 20, a function generator 300 is used with input data $a$, R and theta to develop the quantity epsilon which is described in connection with Figure 15. The quantities epsilon and theta are applied to the addition or summer network 302 to develop the quantity N in accordance with preceding discussion. The voltage corresponding to N is applied, on the one hand, to the differentiating network 304 and, on the other hand, to the function generator 306 which serves to develop the function discussed in connection with Figure 16. The function generator 306 has as input voltages thereto the voltages corresponding to N, $a$ and R and develops the output voltage delta lambda. The voltages delta lambda and R are applied to the summer or additive network 308 to develop the quantity S.

The quantities theta and epsilon are applied to the subtractive or differencer network 320, and the output thereof is applied to the null detector switch actuator 324 and the differentiating network 326. The heading control loop operates on the basis of adjusting the heading of the aircraft so that the time differential of N is equal to 0. By such control, account is taken of factors such as cross wind components since the observed coordinates are with respect to a fixed origin, i.e., the TWS radar situs. The speed normalization and ideal S coordinate generator is as above described and operates in the same manner to develop change speed control signals as well as change altitude control signals.

It is observed that the switch 328 shown in Figure 20 is actuated as discussed above so that it remains in one position until theta minus epsilon is zero; and, thereafter, the switch is in a second position corresponding to the flight of aircraft along the turning circle.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a system of the character described wherein it is desired to control the flight of aircraft along paths which comprise straight lines extending tangential to a pair of tangential turning circles, means deriving an electrical quantity representing a moving zone in space, means deriving voltages representative of the actual position of an aircraft in said zone, means comparing said voltages with said electrical quantity to obtain error signals, and means controlled by said error signals for constraining said aircraft along one of said paths.

2. In a system of the character described wherein it is desired to control the flight of aircraft along paths which comprise straight lines extending tangential to a pair of tangential turning circles, means deriving voltages representative of the actual position of the aircraft, means deriving an electrical quantity representing the ideal position of the aircraft with respect to one of said paths, means for effecting a comparison between said voltages and said electrical quantity to derive error signals, means controlled by said error signals for constraining the flight of said aircraft along one of said paths.

3. In a system of the character described wherein it is desired to control the flight of aircraft along paths which comprise straight lines extending tangential to a pair of tangential turning circles, means deriving an electrical quantity representing both a moving zone in space as well as ideal coordinates for flight along one of said paths, means deriving voltages representative of the actual coordinates of the aircraft, means comparing said ideal coordinate voltages with said actual coordinate voltages to obtain an error signal, and means controlled by said error signal for constraining the flight of said aircraft along one of said paths.

4. In a system of the character described wherein it is desired to control the flight of aircraft along paths which comprise straight lines extending tangential to a pair of tangential turning circles, means producing an electrical quantity representing a zone as well as the ideal coordinates of an aircraft in said zone, means altering the last mentioned means for modifying said electrical quantity in accordance with the expected speed of said aircraft, means deriving voltages representative of the actual coordinates of the aircraft in said zone, means comparing said ideal coordinate voltages with said actual coordinate voltages to derive error signals, and means controlled by said error signals for constraining the flight of said aircraft along one of said paths.

5. In a system of the character described wherein it is desired to control the flight of aircraft along paths which comprise straight lines extending tangential to a pair of tangential turning circles, means deriving an electrical quantity representing a moving zone in space, said last-mentioned means incorporating means for developing voltages representing the ideal coordinates of a path in the particular zone, means deriving voltages representative of the actual coordinates of the aircraft, means for comparing said voltages representing said ideal coordinates with said voltages representing the actual coordinates and producing an error signal in accordance with the comparison, and means controlled by said error signal for constraining the flight of the aircraft along one of said paths.

References Cited in the file of this patent

UNITED STATES PATENTS

| | | |
|---|---|---|
| 2,421,106 | Wight et al. | May 27, 1947 |
| 2,475,221 | Coley | July 5, 1949 |
| 2,521,697 | Deloraine et al. | Sept. 12, 1850 |
| 2,588,930 | Kendall et al. | Mar. 11, 1952 |
| 2,636,167 | Schuck | Apr. 21, 1953 |
| 2,654,882 | Ergen | Oct. 6, 1953 |
| 2,782,411 | McNaney | Feb. 19, 1957 |